(12) United States Patent
Tombe et al.

(10) Patent No.: US 10,913,134 B2
(45) Date of Patent: Feb. 9, 2021

(54) ASSEMBLY MANUFACTURING APPARATUS AND ASSEMBLY MANUFACTURING METHOD

(71) Applicant: MITSUBISHI HEAVY INDUSTRIES, LTD., Tokyo (JP)

(72) Inventors: Toshihiro Tombe, Tokyo (JP); Naoki Goto, Tokyo (JP); Makoto Hirai, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 159 days.

(21) Appl. No.: 15/567,548

(22) PCT Filed: Jul. 11, 2016

(86) PCT No.: PCT/JP2016/070379
§ 371 (c)(1),
(2) Date: Oct. 18, 2017

(87) PCT Pub. No.: WO2017/073116
PCT Pub. Date: May 4, 2017

(65) Prior Publication Data
US 2018/0104777 A1    Apr. 19, 2018

(30) Foreign Application Priority Data

Oct. 28, 2015 (JP) ................................. 2015-212038

(51) Int. Cl.
*B23P 19/04* (2006.01)
*B25J 13/08* (2006.01)
(Continued)

(52) U.S. Cl.
CPC ............. *B23P 19/04* (2013.01); *B21J 15/142* (2013.01); *B23P 19/10* (2013.01); *B25J 9/1682* (2013.01);
(Continued)

(58) Field of Classification Search
CPC ....... B23P 19/04; B23P 19/10; B23P 2700/01; B25J 9/1682; B25J 9/1694; B25J 13/08;
(Continued)

(56) References Cited

U.S. PATENT DOCUMENTS 5,380,978 A * 1/1995 Pryor .................... B23K 26/032
219/121.64
5,910,894 A * 6/1999 Pryor ............... G05B 19/41875
219/121.64
(Continued)

FOREIGN PATENT DOCUMENTS

DE   20 2013 101 036 U1   9/2014
EP         3284559 A1      2/2018
(Continued)

OTHER PUBLICATIONS

Europe Patent Office, "Search Report for European Patent Application No. 16859353.1," dated Mar. 16, 2018.
(Continued)

*Primary Examiner* — Christopher M Koehler
(74) *Attorney, Agent, or Firm* — Manabu Kanesaka; Kenneth Berner; Benjamin Hauptman

(57) ABSTRACT

An object of the present invention is to provide an assembly manufacturing device and an assembly manufacturing method capable of reducing error when the actual position of a long member is detected, and precisely setting a reference point and a coordinates system. The long member assembly apparatus provides a plurality of hand parts for gripping a long member, a touch plate for securing the first end of the long member and restricting the movement of the long member in the longitudinal direction, a laser tracker for detecting the installation position of the touch plate, and a reference determining part for determining reference coordinates or reference point to be used in for adjusting the
(Continued)

position of the hand parts, based on the installation position of the touch plate detected by the laser tracker.

8 Claims, 13 Drawing Sheets

(51) Int. Cl.
| | |
|---|---|
| *G01S 17/08* | (2006.01) |
| *G01B 11/00* | (2006.01) |
| *B21J 15/14* | (2006.01) |
| *B64F 5/10* | (2017.01) |
| *B23P 19/10* | (2006.01) |
| *B25J 9/16* | (2006.01) |
| *B64F 5/50* | (2017.01) |

(52) U.S. Cl.
CPC ............ *B25J 9/1694* (2013.01); *B25J 13/08* (2013.01); *B25J 13/089* (2013.01); *B64F 5/10* (2017.01); *B64F 5/50* (2017.01); *G01B 11/00* (2013.01); *B23P 2700/01* (2013.01); *G01S 17/08* (2013.01); *G05B 2219/37288* (2013.01); *G05B 2219/39123* (2013.01); *G05B 2219/39129* (2013.01); *Y10S 901/47* (2013.01)

(58) Field of Classification Search
CPC .. B25J 13/089; B64F 5/10; B64F 5/50; G01B 11/00; G01S 17/08; G05B 2219/37288; G05B 2219/39123; G05B 2219/39129; B21J 15/142
See application file for complete search history.

(56) References Cited

U.S. PATENT DOCUMENTS

| | | | |
|---|---|---|---|
| 6,317,954 B1 * | 11/2001 | Cunningham | G01B 11/002 29/407.09 |
| 9,364,926 B2 * | 6/2016 | Batt | B23P 13/00 |
| 10,179,662 B2 * | 1/2019 | Bickerstaff | G05B 19/4099 |
| 2003/0048459 A1 | 3/2003 | Gooch | |
| 2003/0207742 A1 | 11/2003 | Hazlehurst et al. | |
| 2005/0153818 A1 | 7/2005 | Hazlehurst et al. | |
| 2006/0176156 A1 | 8/2006 | Hazlehurst et al. | |
| 2009/0140038 A1 | 6/2009 | Hazlehurst et al. | |
| 2010/0283195 A1 | 11/2010 | Hazlehurst et al. | |
| 2014/0325813 A1 | 11/2014 | Batt | |
| 2018/0147729 A1 | 5/2018 | Tombe et al. | |

FOREIGN PATENT DOCUMENTS

| | | |
|---|---|---|
| EP | 3287228 A1 | 2/2018 |
| EP | 3290150 A1 | 3/2018 |
| JP | 2001-300823 A | 10/2001 |
| JP | 2001-334426 A | 12/2001 |
| JP | 2003-530561 A | 10/2003 |
| JP | 2009-101507 A | 5/2009 |
| JP | 2011-27670 A | 2/2011 |
| JP | 2012-247292 A | 12/2012 |

OTHER PUBLICATIONS

PCT, "International Search Report for International Application No. PCT/JP2016/070379" dated Oct. 11, 2016.

* cited by examiner

ASSEMBLY MANUFACTURING APPARATUS AND ASSEMBLY MANUFACTURING METHOD

RELATED APPLICATIONS

The present application is National Phase of International Application No. PCT/JP2016/070379 filed Jul. 11, 2016, and claims priority from Japanese Application No. 2015-212038, filed Oct. 28, 2015, the disclosure of which is hereby incorporated by reference herein in its entirety.

TECHNICAL FIELD

The present invention relates to an assembly body manufacturing device and an assembly body manufacturing method.

BACKGROUND ART

In a typical manufacturing method, when a long member that has low rigidity and readily bends is mounted with another component, the long member is held by a fixing jig. Such a fixing jig has high rigidity and can thus prevent the long member from bending when the other component is mounted on the long member.

Citation List

Patent Literature

Patent Literature 1: JP-A-2011-27670

SUMMARY OF INVENTION

Technical Problems

The long member is, for example, a stringer, which is a structure of an aircraft, and has a length of approximately 5 m to 15 m. Such stringers have different shapes depending on the installation positions, and various types of stringers may be installed in one aircraft. Thus, various types of fixing jigs for holding the stringers need to be prepared in mounting another component, such as clips, on the stringers.

Furthermore, plate-shaped skins joined to the stringers often have double-curved surfaces. When the skins have double-curved surfaces, the stringers have stereoscopic shapes with compound curves. That is, the stringers are not linear members that can be installed along one plane, and the fixing jigs for holding the stringers also have complex shapes.

Therefore, it is conceivable to grip the long member using a plurality of robots for gripping in place of a jig for securing. The position where the robot for gripping grips the long member can change depending on the length and shape of the long member, and therefore the degrees of freedom required to handle a plurality of types and complex shaped long members is high, compared to a jig for securing.

If the long member is gripped and retained by a hand part of a robot for gripping, or if another component is joined and retained by a mounting robot to the retained long member, setting one arbitrary point as a reference point (origin) or setting a coordinates system is necessary in order to control the gripping robot or mounting robot and determining the position of the long member. Note that the aforementioned problems are not limited to the stringers used for aircrafts and typically occur when holding a long member that has low rigidity and readily bends.

The aforementioned Patent Literature 1 discloses providing a target on both a stationary object and the equipment portion to be removed, and measuring the positional coordinates using a laser measuring apparatus, so as to restore high precision, when removing a large device such as a compressor or the like and restoring.

In light of the foregoing situation, an object of the present invention is to provide an assembly manufacturing device and an assembly manufacturing method capable of reducing error when the actual position of a long member is detected, and precisely setting a reference point and a coordinates system.

Solution to Problem

The assembly manufacturing device according to the first embodiment of the present invention includes: a plurality of first gripping parts configured to grip a first member having a long shape; a retaining part that retains a first end of the first member and constricts movement of the first member in the longitudinal direction; a first drive part configured to move each of the plurality of first gripping parts and adjust a position of each of the plurality of first gripping parts gripping the first member; a detecting part that detects the installation position of the retained part; a reference determining part that determines the reference coordinates or reference point that is used for adjusting the position of the first gripping part, based on the installation position of the retaining part that was detected by the detecting part; a storing part that stores an original shape of the first member; and a control unit configured to drive the first drive part and adjust positions of the plurality of first gripping parts gripping the first member, based on the original shape stored in the storing part and the reference coordinates or reference points determined by the reference determining part, such that a shape of the first member gripped by the plurality of first gripping parts matches the original shape.

With this configuration, the plurality of first gripping parts grip the long first member, and the first drive part moves each of the first gripping parts gripping the first member and adjusts the position of the gripping parts. At this time, the control unit drives the first drive part to adjust the positions of the plurality of first gripping parts based on the original shape of the first member stored in the storage unit. In this manner, the first member gripped by the plurality of first gripping parts is held in a shape matching the original shape of the first member stored in the storing part by adjusting the positions of the plurality of first gripping parts. Furthermore, the retaining part retains a first end of the first member and restrains movement of the first member in the longitudinal direction, so that the first end of the first member can be set as a reference position for determining the position of the first end of the first member. Furthermore, the reference coordinates or reference point used for adjusting the positions of the first gripping parts is determined from the installation position of the retaining part where the first end of the first member is retained, such that the position of the first member can be adjusted precisely.

In a first aspect, the assembly manufacturing device further includes a first reflecting part that reflects laser light, provided on the retaining part;
wherein the detecting part includes:
an irradiating part that irradiates laser light while scanning;

a light receiving part that receives the laser light reflected by the first reflecting part; and a position calculating part that calculates an installation position of the retaining part on which the first reflecting part is provided, based on the laser light reflected by the first reflecting part and received by the light receiving part;

wherein the reference determining part determines the reference coordinates or reference point based on the installation position of the retaining part calculated by the position calculating part.

With this configuration, the irradiating part irradiates laser light, the first reflecting part provided on the retaining part reflects the laser light, and the light receiving part receives the laser light. The installation position of the retaining part is calculated based on the laser light received by the light receiving part. Furthermore, the reference point or the reference coordinates are determined from the calculated installation position of the retaining part.

The aforementioned first aspect further contains two or one mutually separated second reflecting parts provided at a different position than the retaining part; wherein one or two mutually separated first reflecting parts are provided on the retaining part; the position calculating part calculates the installation position of the second reflecting part based on the laser light reflected by the second reflecting part and received by the light receiving part; and the reference determining part determines the reference coordinates based on the installation position of the second reflecting part and the installation position of the retaining part calculated by the position calculating part.

With this configuration, one or two first reflecting parts are provided on the retaining part provided on the first end side of the first member, and two or one second reflecting parts are provided at a position that differs from the retaining part. The laser light is reflected by at least a total of three first reflecting parts and second reflecting parts, and the reference coordinates are determined based on the laser light reflected by the first reflecting parts and the second reflecting parts. Furthermore, the first reflecting part is provided on the retaining part that retains the first end of the first member, and the reference coordinates are determined based on the installation position of the retaining part, so the position of the first member can be adjusted precisely.

With the first aspect, three first reflecting parts are provided, mutually separated on the retaining part;

the position calculating part calculates the installation position of the retaining part on which the first reflecting parts are provided, based on the laser light reflected by the three first reflecting parts and received by the light receiving part; and the reference determining part determines the reference point based on the installation position of the retaining part calculated by the position calculating part.

With this configuration, the three first reflecting parts are provided on the retaining part, and the laser light is reflected by these three first reflecting parts. The reference point is determined based on the laser light reflected by the three first reflecting parts. Furthermore, the three first reflecting parts are provided on the retaining part that retains the first end of the first member, and the reference point is determined based on the installation position of the retaining part, so the position of the first member can be adjusted precisely.

With the first aspect, the position where the first reflecting part is provided on the retaining part is determined based on the detection error of the detecting part and the positional error of the reference point determined by the reference determining part.

With this configuration, the position of the reference point can be precisely set by providing the first reflecting part such that the positional error of the reference point determined by the reference determining part is smaller than the detection error of the detecting part, for example. Conversely, if the positional error of the reference point determined by the reference determining part is larger than the detection error of the detecting part, the degrees of freedom of the installation position of the first reflecting part can be increased, but the positional precision of the reference point will be inferior.

The first aspect further includes second gripping parts that grip the first member in a quantity fewer than the first gripping parts;

a second driving part that moves the second gripping parts and adjusts the position of the second gripping parts that grip the first member, having higher precision than the positional precision during positional adjustment of the first gripping part by the first driving part; and a third reflecting part provided on the second gripping part; wherein the position calculating part calculates the installation position of the third reflecting part based on the laser light reflected by the third reflecting part and received by the light reflecting part; the reference determining part determines the position that the second gripping part grips the first member based on the installation position of the third reflecting part that was calculated by the position calculating part; and the control unit drives the first driving part and the second driving part, and adjusts the position of the plurality of first gripping parts and the second gripping parts such that the shape of the first member gripped by the first gripping parts and the second gripping part matches the original shape of the first member stored in the storing part, based on the original shape of the first member stored in the storing part and the reference coordinates or reference point determined by the reference determining part.

With this configuration, the plurality of first gripping parts grip the long first member, and the first drive part moves each of the first gripping parts gripping the first member and adjusts the position of the gripping parts. Furthermore, the long first member is gripped by a fewer number of second gripping parts than first gripping parts, and the second gripping parts are moved by the second drive part while adjusting the position. Positional adjustment of the second gripping part by the second drive part has higher precision than the positional precision during positional adjustment of the first gripping part by the first drive part. At this time, the control unit drives the first drive part and the second drive part based on the original shape of the first member stored in the storing part, and adjusts the position of a plurality of first gripping parts and second gripping parts. In this way, the first member gripped by the plurality of first gripping parts and second gripping parts is held in a shape matching the original shape of the first member stored in the storing part by adjusting the positions of the plurality of gripping parts. Furthermore, positional shifting of a predetermined portion of the first member can be reduced by holding the first member by the second gripping part with high positional precision in addition to the plurality of first gripping parts, as compared to when the second gripping part is not used.

Furthermore, a third reflecting part is provided on the second gripping part, and the laser light is reflected by the third reflecting part. The position that the second gripping part grips the first member is determined from the installation position of the third reflecting part calculated based on the laser light reflected by the third reflecting part. Therefore, the position of the second gripping part is precisely determined, and the gripping position of the second member is precisely determined.

The first aspect further includes a mounting robot for mounting a second member to the first member, and a fourth reflecting part provided on the mounting robot; wherein the position calculating part calculates the installation position of the fourth reflecting part, based on the laser light reflected by the fourth reflecting part and received by the light receiving part; and the reference determining part determines the position where the mounting robot mounts the second member, based on the installation position of the fourth reflecting part calculated by the position calculating part.

With this configuration, the mounting robot mounts the second member to the first member gripped by the first gripping parts and the second gripping parts. Furthermore, a fourth reflecting part is provided on the mounting robot, and the laser light is reflected by the fourth reflecting part. The position that the mounting robot mounts the second member is determined from the installation position of the fourth reflecting part calculated based on the laser light reflected by the fourth reflecting part. Thereby, the position of the mounting robot is precisely determined, and the mounting precision of the second member is enhanced.

The assembly manufacturing method according to the second aspect of the present invention includes: a step where a plurality of first gripping parts grip a first member having a long shape; a step where a retaining part retains the first end of the first member and restricts movement of the first member in the longitudinal direction; a step where a first driving part that moves the first gripping parts and adjusts a position of the first gripping parts that grip the first member; a step where a detecting part detects the installation position of the retaining part; and a step where a reference determining part determines a reference point or a reference coordinates that is used for adjusting the position of the first gripping part, based on the installation position of the retaining part detected by the detecting part, wherein a control unit drives the first driving part and adjusts the positions of the plurality of first gripping parts that grip the first member, such that the shape of the first member gripped by the first gripping part matches the original shape, based on the original shape of the first member stored in the storing part and the reference coordinates or reference point determined by the reference determining part.

Advantageous Effects of Invention

The present invention can minimize the error when the actual position of the long member is detected, and the reference point and reference coordinates can be precisely set, and the precision for adjusting the position of the long member can be enhanced.

DESCRIPTION OF EMBODIMENTS

Figure 1:
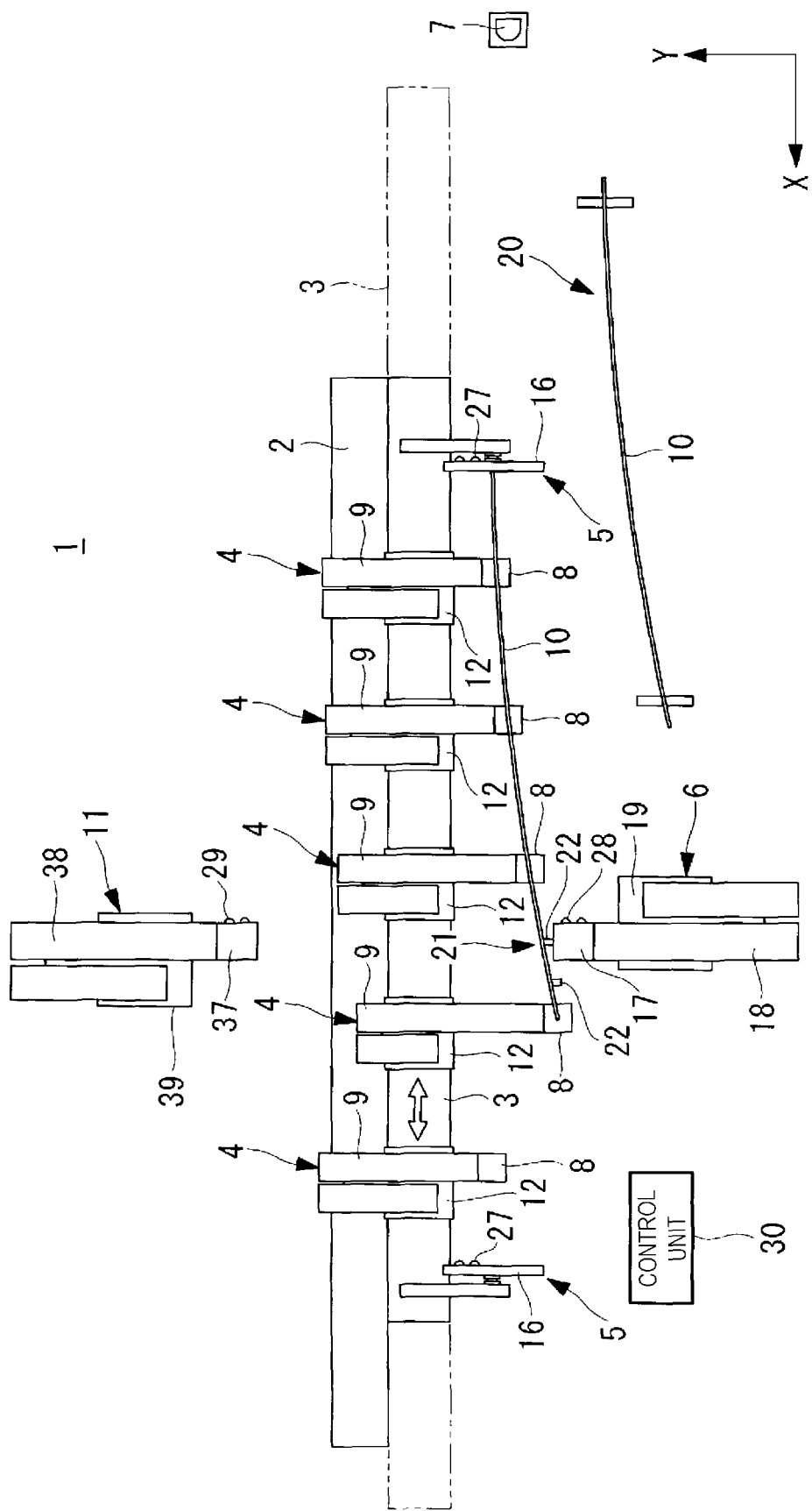
FIG. 1 is a plan view illustrating a long member assembling device according to an embodiment of the present invention.

A long member assembling device according to one embodiment of the present invention will be described below with reference to the drawings.

First, a configuration of the long member assembling device according to the present embodiment is described with reference to FIG. 1.

The long member assembling device 1 includes a conveyor 2, a table 3, a plurality of supporting robots 4, touch plate 5, mounting robot 6, laser tracker 7, and gripping robot 11. The long member assembling device 1 is an assembly body manufacturing device that manufactures an assembly body, the long member assembling device 1 having a configuration in which another component 22, which is a second member, is mounted on a long member 10, which is a first member.

The long member assembling device 1 takes out the long member 10 from a supplying position 20 and conveys the long member 10 to a mounting position 21. Then, the other component 22 is mounted on the long member 10 in the mounting position 21. Before the component 22 is mounted, the long member 10 is temporarily placed in the supplying position 20, and the mounting robot 6 and the gripping robot 11 are placed in the vicinity of the mounting position 21 and retained on the floor.

The long member 10 is, for example, a stringer which is a structural member of an aircraft. The stringer has a length of approximately 5 m to 15 m and has a stereoscopic shape with a compound curve, for example. Another component 22 called clip, for example, is mounted on the stringer. Herein, an object having a configuration in which the clip is mounted on the stringer corresponds to the assembly body. The clip is a component used in forming a long frame to which a plurality of the stringers are connected. When the frame is assembled together with the stringers, the clips mounted in precise positions in the longitudinal direction of the stringers enable the frame to be formed with the stringers connected thereto while the frame does not bend.

A generally used conveyor can be used as the conveyor 2. The table 3, which will be described after, is placed on the conveyor 2. The conveyor 2 moves the table 3 from the first end side to a second end side and from the second end side to the first end side. The first end side of the conveyor 2 is located in the vicinity of the supplying position 20 for the long member 10, and the conveyor 2 moves the table 3 from the vicinity of the supplying position 20 to the vicinity of the mounting robots 6.

When a plurality of the components 22 are mounted on the long member 10 in the longitudinal direction, the mounting robot 6 mounts one of the components 22 in a predetermined region of the long member 10, and then the conveyor 2 conveys the table 3 on which the supporting robots 4 that grips the long member 10 is installed. This operation allows the long member 10 to be conveyed while the supporting robots 4 grips the long member 10 while maintaining a component shape of the long member 10 in a predetermined holding shape, and the mounting robot 6 can mount a component 22 in a next predetermined region. After the other component 22 is mounted in the predetermined region, the conveyor 2 conveys the table 3, and the mounting robot 6 also mounts the component 22 in a next predetermined region of the long member 10. This operation is repeated to mount the components 22 on the entirety of the long member 10 in the longitudinal direction. A single component 22 may be mounted in a predetermined region, or a plurality of the components 22 may be mounted in the longitudinal direction of the predetermined region.

The supporting robots 4 and the touch plate 5 are installed in a row on the table 3. This configuration enables the supporting robots 4 and the touch plate 5 to integrally move on the conveyor 2. The supporting robots 4 are placed in a row on the table 3. The touch plate 5 are placed on both ends of the table 3, that is, both sides of the supporting robots 4. The number of the supporting robots 4 placed on the table 3 and the distance between the supporting robots 4 are preliminarily determined depending on the long member 10 to be assembled. The number of the supporting robots 4 to be operated for gripping the long member 10 is determined based on the length of the long member 10 to be actually gripped. FIG. 1 illustrates a state in which four out of five supporting robots 4 are gripping the long member 10.

Figure 2:
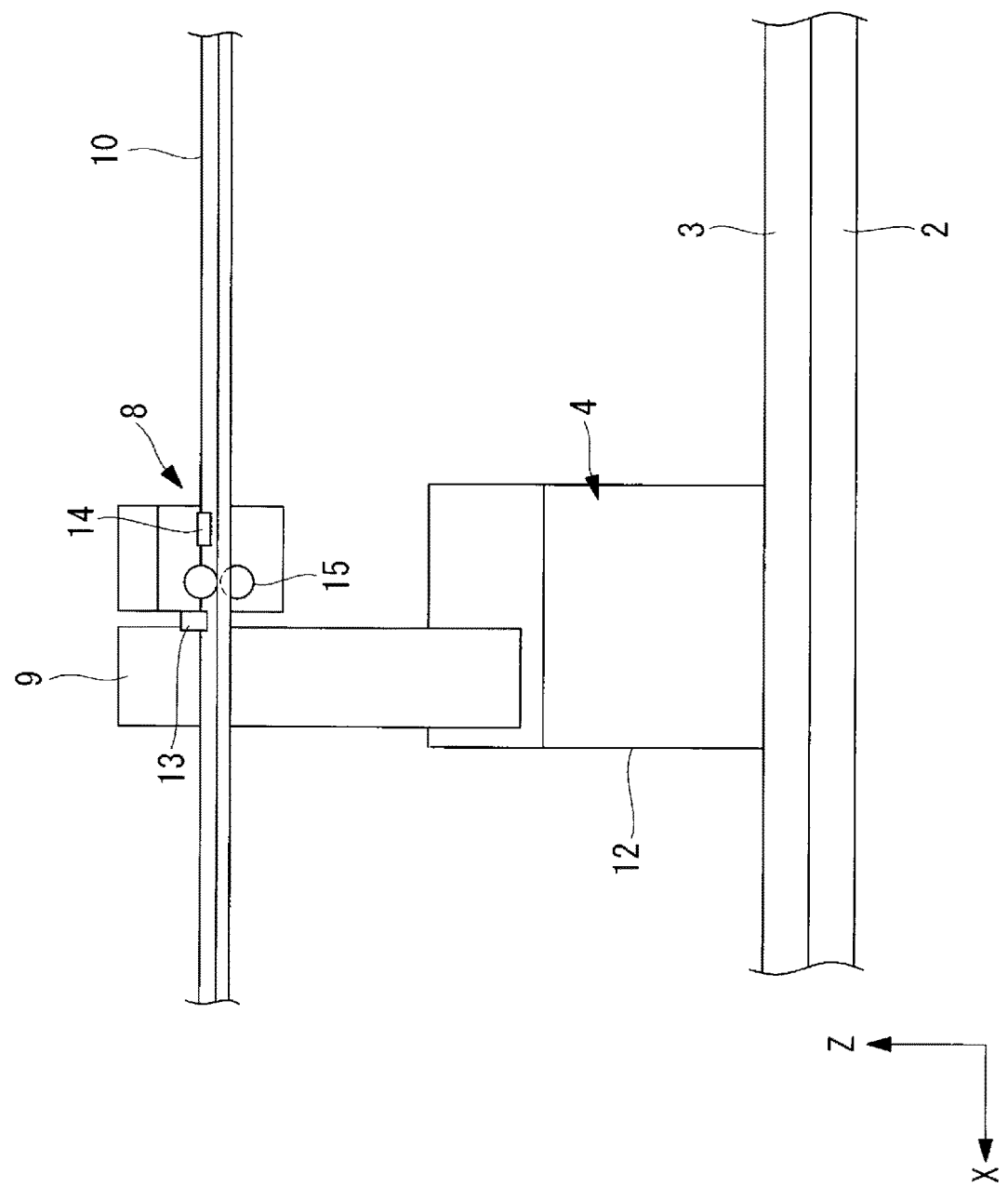
FIG. 2 is a front view illustrating a gripping robot of the long member assembling device according to the embodiment of the present invention.

As illustrated in FIGS. 1 and 2, the supporting robots 4 each include a hand part 8 that grips the long member 10, an arm part 9 provided with the hand part 8 at the leading end thereof, and a trunk part 12 supporting the arm part 9. The hand part 8 is an example of a first gripping part, and the arm part 9 and the trunk part 12 are an example of a first drive part.

The hand part 8 includes a stopper 13 that grips the long member 10 to prevent the long member 10 from falling off, an A reference plane roller part 14 that determines a Y coordinate of the long member 10 so that the hand part 8 can move the long member 10 in an X direction when the stopper 13 does not grip the long member 10, and a B reference plane roller part 15 that determines a Z coordinate. A detailed configuration of the hand part 8 will be described below.

The arm part 9 and the trunk part 12 move the hand part 8 so that the hand part 8 can appropriately grip the long member 10. A generally used configuration of robots can be applied to the arm part 9 and the trunk part 12. The supporting robots 4 detects the position of the hand part 8 and moves the hand part 8 based on a reference position the supporting robots 4 itself has.

The touch plate 5 each include a flat plate part 16, and a first end of the long member 10 comes into contact with a surface of the flat plate part 16.

The touch plate 5 restrains the first end of the long member 10. This configuration allows a position of the first end portion of the long member 10 coming into contact with the touch plate 5 to be set as a reference position for positioning the other component 22 when the other component 22 is mounted. A detailed configuration of the touch plate 5 will be described below.

The touch plate 5 is provided with reflectors 27 that receive laser light from the laser tracker 7. The laser tracker 7 detects positional information of the reflectors 27 disposed on the touch plate 5 based on the laser light radiated from the laser tracker 7 and reflected by the reflectors 27. The positional information of the reflectors 27 enables detection of the position and inclination of the touch plate 5 and determination of the reference point or reference coordinates.

One touch plate 5 is placed on either end of the table 3, that is, on each side of the plurality of supporting robots 4. Only one of the two touch plate 5 is used to bring the long member 10 into contact with the touch plate 5. The touch plate 5 is selected depending on the shape of the long member 10. FIG. 1 is a view illustrating a state in which the long member 10 is in contact with the touch plate 5 located closer to the laser tracker 7.

The mounting robot 6 include a hand part 17 that grips other components 22, an arm part 18 provided with the hand part 17 at the leading end thereof, and a trunk part 19 supporting the arm part 18.

The arm part 18 and the trunk part 19 have a configuration where the other components 22 gripped by the hand part 17 are moved to the mounting position 21 of the long member 10. A generally used configuration of robots can be applied to the arm part 18 and the trunk part 19. The mounting robot 6 detects the position of the hand part 17 and moves the hand part 17 based on a reference position the mounting robot 6 itself has and positional information of reflectors 28 disposed on the hand part 17 of the mounting robot 6.

The hand part 17 of the mounting robot 6 is provided with reflectors 28 that reflect laser light from the laser tracker 7. The laser tracker 7 detects the positional information of the reflectors 28 disposed on the hand part 17 by the laser light radiated from the laser tracker 7 and reflected by the reflectors 28. The hand part 17 can be controlled based on the positional information of the reflectors 28 detected by the laser tracker 7, and the precision of positional control of the hand part 17 of the mounting robot 6 can be enhanced more than if the reflectors 28 are not provided.

At least three reflectors 28 are installed on the hand part 17, and the position of each of the reflectors 28 is detected by the laser tracker 7. This configuration enables correct calculation of the position and inclination of the hand part 17.

The mounting robot 6, gripping robot 11, or other robots also have a function of clamping the long number 10 and component 22, making holes, or riveting.

The gripping robot 11 has a hand part 37 with a configuration that grips the long member 10 and other components 22, an arm part 38 provided with the hand part 37 at the leading end thereof, a trunk part 39 supporting the arm part 38, and the like.

The hand part 37 has a configuration that can move the long member 10 in an X direction, and has a configuration that can determine the position of the Y coordinate and the Z coordinate of the long member 10.

The arm part 38 and the trunk part 39 are configured to move the hand part 37 so that the hand part 37 can appropriately support the long member 10. A configuration of a generally used robot can be applied to the arm part 38 and the trunk part 39. The gripping robot 11 detects the position of the hand part 37 and moves the hand part 37 based on a reference position of the gripping robot 11 itself and positional information of the reflectors 29 provided on the hand part 37 of the gripping robot 11.

The hand part 37 of the gripping robot 11 is provided with reflectors 29 that reflect laser light from the laser tracker 7. The laser tracker 7 detects the positional information of the reflectors 29 provided on the hand part 37 based on the laser light radiated from the laser tracker 7 and reflected by the reflectors 29. The hand part 37 can be controlled based on the positional information of the reflectors 29 detected by the laser tracker 7, and the precision of positional control of the hand part 37 of the gripping robot 11 can be enhanced, as compared to when the reflectors 29 are not provided. Therefore, with the present embodiment, the gripping robot 11 has less positional error when determining position as compared to the supporting robots 4.

The reflectors 29 are installed at least three points on the hand part 37, and the position of each of the reflectors 29 is detected by the laser tracker 7. This configuration enables correct calculation of the position and inclination of the hand part 37.

The mounting robot 6, gripping robot 11, or other robots also have a function of clamping the long number 10 and components 22, making holes, or riveting, after the gripping robot 11 appropriately supports the long member 10.

The laser tracker 7 scans for laser light, receives the laser light reflected from the reflectors 27, 28, 29, and detects the positions of the reflectors 27, 28, 29. The laser tracker 7 is retained and installed in a position separate from the conveyor 2, the supporting robots 4, the mounting robots 6, and the gripping robot 11.

The laser tracker 7 has an irradiating part 41, a light receiving part 42, and a position calculating part 43. The irradiating part 41 scans for laser light while irradiating. The light receiving part 42 receives the laser light reflected from the reflectors 27, 28, 29.

The position calculating part 43 calculates the position of the reflectors 27, 28, 29 based on the laser light that was reflected by the reflectors 27, 28, 29 and received by the light receiving part 42. The reflector 27 is provided on the touch plate 5, and thus the position calculating part 43 calculates the installation position of the touch plate 5 by having the position calculating part 43 calculate the position of the reflector 27.

The reference determining part 50 determines the reference coordinates or the reference point based on the installation position of the touch plate 5 calculated by the position calculating part. The reference coordinates or reference point is used for determining the position of the long number 10, and for adjusting the position of the hand part 8 of the supporting robots 4. Furthermore, the reference determining part 50 determines the position that the hand part 37 of the gripping robot 11 grips the long member 10, based on the installation position of the reflector 29 calculated by the position calculating part. Furthermore, the reference determining part 50 determines the position that the hand part 17 of the mounting robot 6 mounts the other component 22, based on the installation position of the reflector 28 calculated by the position calculating part.

Figure 3:
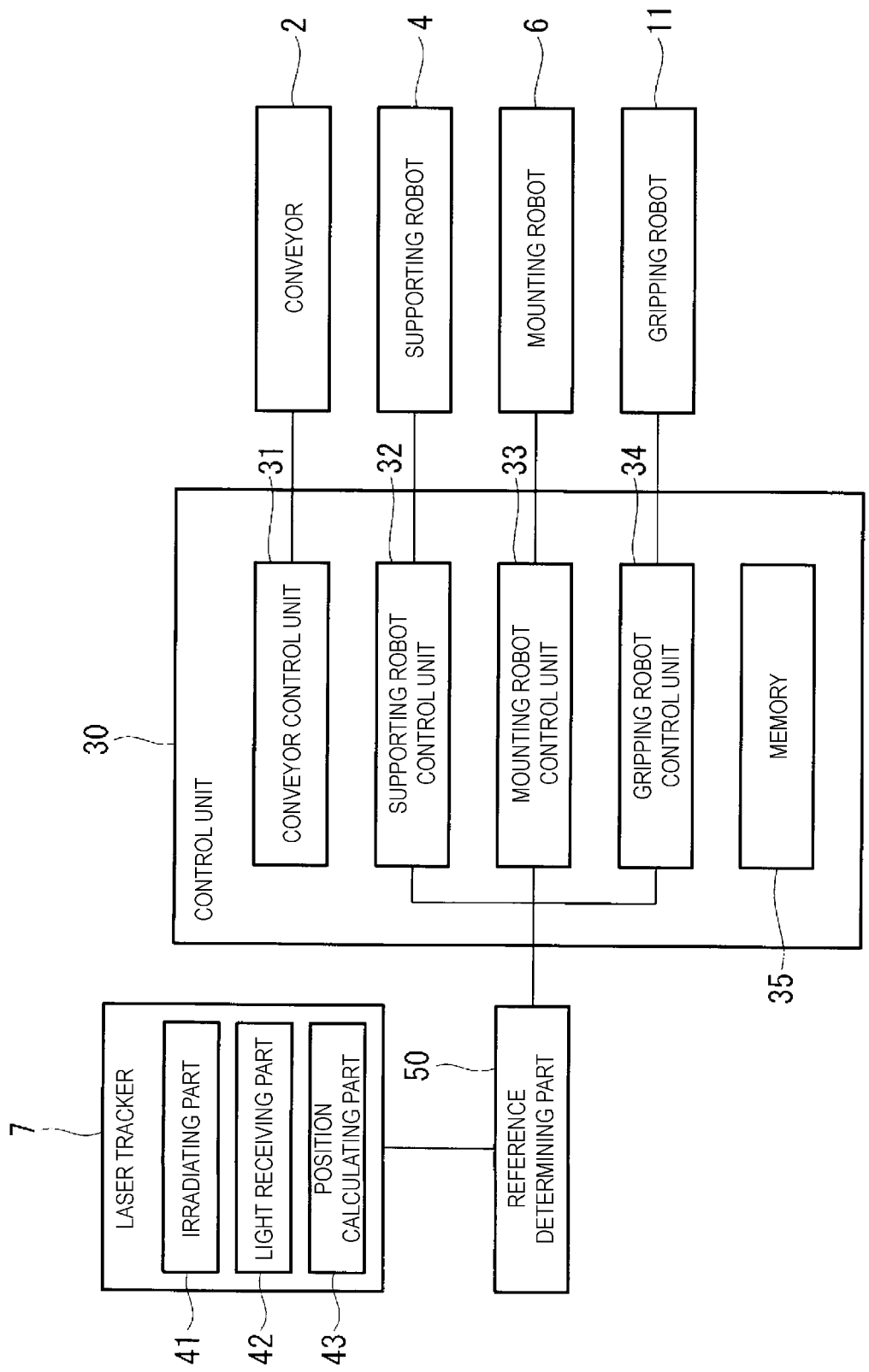
FIG. 3 is a block diagram illustrating a control unit of the long member assembling device according to the embodiment of the present invention.

As illustrated in FIG. 3, a control unit 30 that controls the long member assembling device 1 includes, for example, a conveyor control unit 31, a supporting robot control unit 32, a mounting robot control unit 33, a gripping robot control unit 34, and the like. The control unit 30 is, for example, a computer executed with a program.

The conveyor control unit 31 adjusts the position of the conveyor 2 so that the predetermined region of the long member 10 moves to the mounting position 21. The conveyor control unit 31 actuates the conveyor 2 to move the table 3 to a predetermined position based on the region of the long member 10 where the component 22 is to be mounted and the mounting position 21.

The supporting robot control unit 32 detects the position of the hand part 8 and causes the hand part 8 to move based on the reference position of the supporting robots 4 itself and the reference point and reference coordinates determined by the positional information of the reflectors 27 disposed on the touch plate 5 as detected by the laser tracker 7. The supporting robot control unit 32 brings an end portion of the long member 10 into contact with the touch plate 5. The supporting robot control unit 32 also causes the hand part 8 of the supporting robots 4 to move corresponding to the original shape of the long member 10 stored in a memory 35.

The mounting robot control unit 33 detects the position of the hand part 17 and causes the hand part 17 to move based on the reference position of the mounting robot 6, the positional information of the reflector 28 provided on the hand part 17 of the mounting robot 6, and the reference point and reference coordinates using the positional information of the reflector 27 provided on the touch plate 5 acquired by the laser tracker 7. The mounting robot control unit 33 operates the hand part 17 to mount the other component 22 on the long member 10. Specifically, the mounting robot control unit 33 causes the hand part 17 to clamp the long member 10 and the component 22, to make holes, or perform riveting. Furthermore, this function can be performed by the gripping robot control unit 34 described below, or the control unit of another robot.

The gripping robot control unit 34 detects the position of the hand part 37 and causes the hand part 37 to move based on the reference position of the gripping robot 11 itself, the positional information of the reflector 29 provided on the hand part 37 of the gripping robot 11, and the reference point and reference coordinates of the positional information of the reflectors 27 provided on the touch plate 5, acquired by the laser tracker 7.

Figure 4:
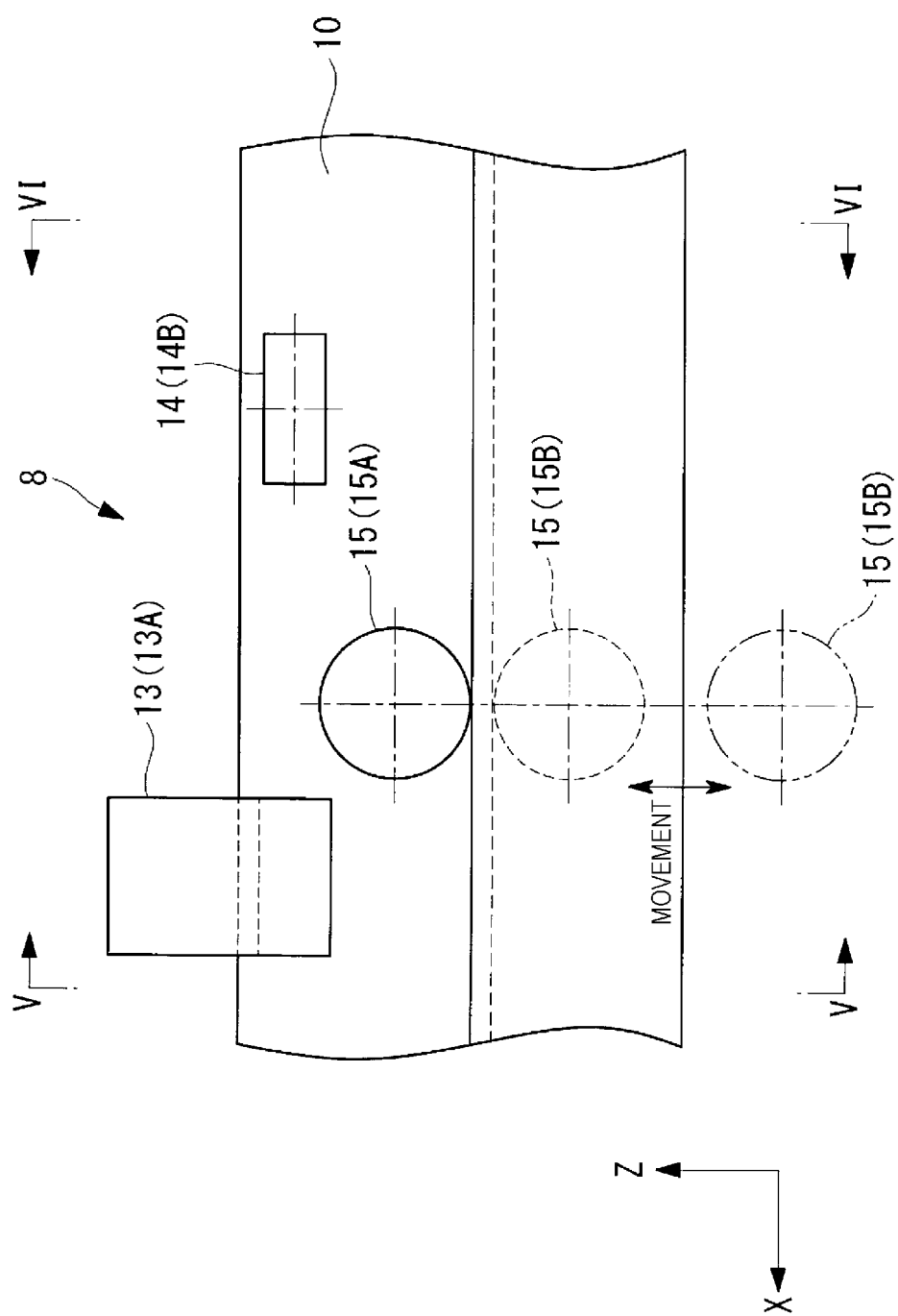
FIG. 4 is a front view illustrating a hand part of the gripping robot of the long member assembling device according to the embodiment of the present invention.
Figure 5:
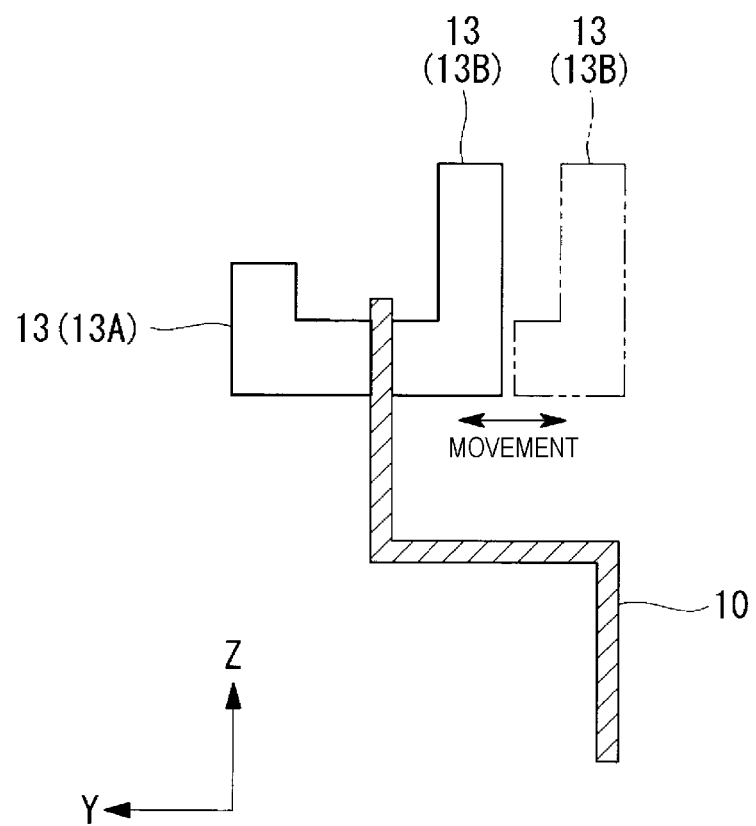
FIG. 5 is a cross-sectional view taken along line V-V in FIG. 4.
Figure 6:
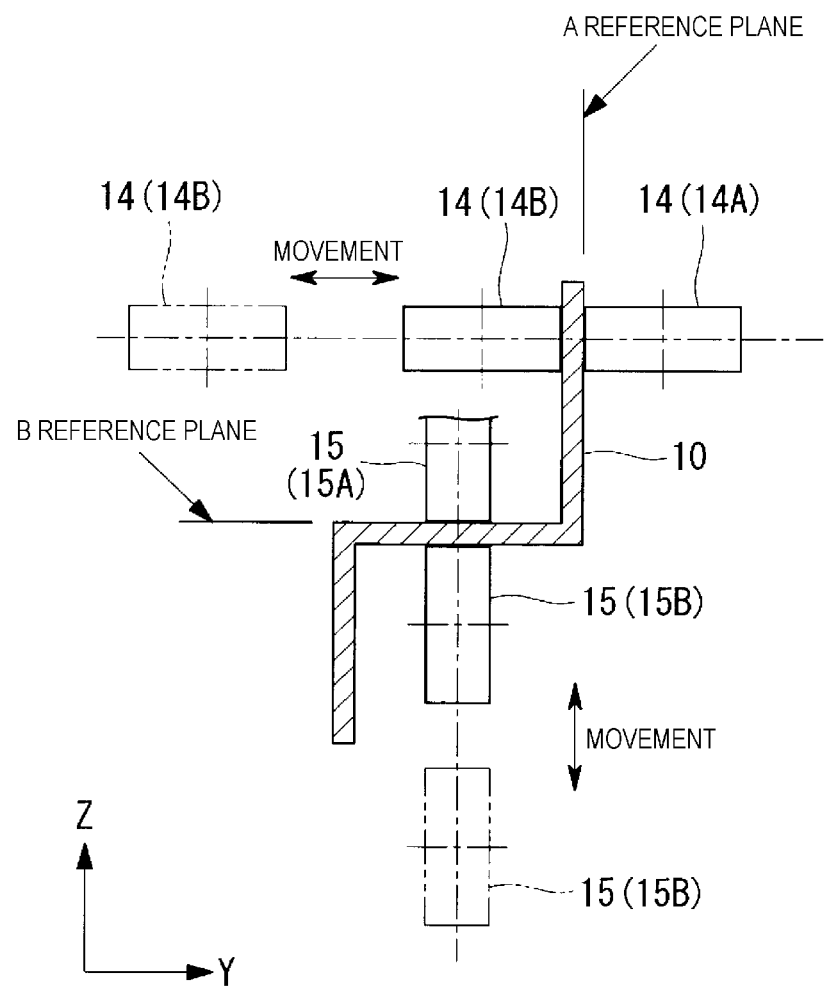
FIG. 6 is a cross-sectional view taken along line VI-VI in FIG. 4.

A configuration of the hand part 8 of the supporting robots 4 will now be described with reference to FIGS. 4 to 6.

The hand part 8 of the supporting robots 4 includes the stopper 13, the A reference plane roller part 14, the B reference plane roller part 15, and the like. Note that FIGS. 4 to 6 illustrate a case in which the horizontal cross section of the long member 10 has a so-called Z shape; however, the present invention can also be applied to a long member 10 having a different cross-sectional shape by changing the stopper 13 and the arrangement position of the plurality of gripping parts.

The stopper 13 sandwiches a flat plate portion of the long member 10 from both sides. The stopper 13 is used in moving the long member 10 from the supplying position 20 to the conveyor 2 and prevents the long member 10 from falling off from the hand part 8 of the supporting robots 4. Furthermore, the long member 10 comes into contact with the touch plate 5 when the long member 10 is gripped using the stoppers 13. At this time, only the stoppers 13 of any one of the supporting robots 4 is required to clamp the long member 10.

After the long member 10 comes into contact with the touch plate 5, the stopper 13 releases the grip on the long member 10.

The stopper 13 is composed of, for example, a fixed component 13A and a movable component 13B. The movable component 13B moves closer to and away from the fixed component 13A by an actuator (not illustrated). When the movable component 13B moves closer to the fixed component 13A, the flat plate portion of the long member 10 is sandwiched. In contrast, when the movable component 13B moves away from the fixed component 13A, sandwiching is released.

The A reference plane roller part 14 positions an A reference plane on the long member 10. The A reference plane roller part 14 adjusts the position of the Y coordinate of the gripped portion.

The A reference plane roller part 14 is composed of a fixed roller 14A and a movable roller 14B. The movable roller 14B moves parallel to the Y axis in the XY plane and moves closer to and away from the fixed roller 14A by an actuator (not illustrated). When the movable roller 14B moves closer to the fixed roller 14A, the flat plate portion of the long member 10 is sandwiched. In contrast, when the movable roller 14B moves away from the fixed roller 14A, sandwiching is released.

The rotation axes of the fixed roller 14A and the movable roller 14B extend perpendicular to the longitudinal direction of the long member 10 and parallel to the A reference plane. This configuration prevents the A reference plane roller part 14 from restraining movement of the long member 10 in the longitudinal direction and allows the long member 10 to move in the longitudinal direction when the fixed roller 14A and the movable roller 14B sandwich the long member 10.

A flat plate surface of the long member 10 coming into contact with the outer peripheral surface of the fixed roller 14A when the fixed roller 14A and the movable roller 14B sandwich the long member 10 is the A reference plane. Thus, by adjusting the position of the outer peripheral surface of the fixed roller 14A coming into contact with the A reference plane using the supporting robots 4, the A reference plane is positioned on the long member 10.

The B reference plane roller part 15 positions a B reference plane on the long member 10. The B reference plane roller part 15 adjusts the position of the Z coordinate of the gripped portion.

Similar to the A reference plane roller part 14, the B reference plane roller part 15 is composed of a fixed roller 15A and a movable roller 15B. The movable roller 15B moves parallel to the Z axis in the XZ plane by an actuator (not illustrated). The rotation axes of the fixed roller 15A and the movable roller 15B extend perpendicular to the longitudinal direction of the long member 10 and parallel to the B reference plane.

A flat plate surface of the long member 10 coming into contact with the outer peripheral surface of the fixed roller 15A when the fixed roller 15A and the movable roller 15B sandwich the long member 10 is the B reference plane. Thus, by adjusting the position of the outer peripheral surface of the fixed roller 15A coming into contact with the B reference plane using the supporting robots 4, the B reference plane is positioned on the long member 10.

Figure 7:
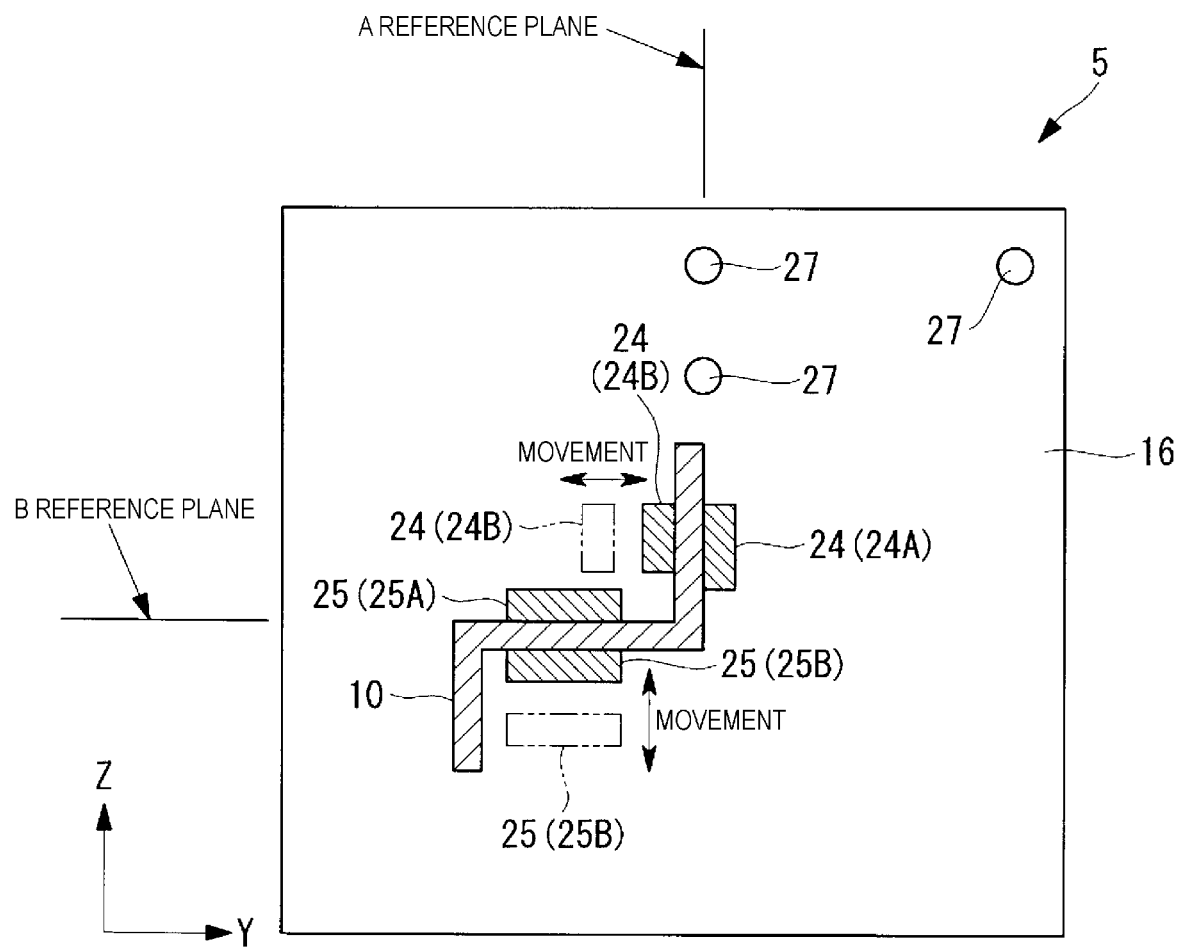
FIG. 7 is a cross-sectional view taken along line VII-VII in FIG. 8.
Figure 8:
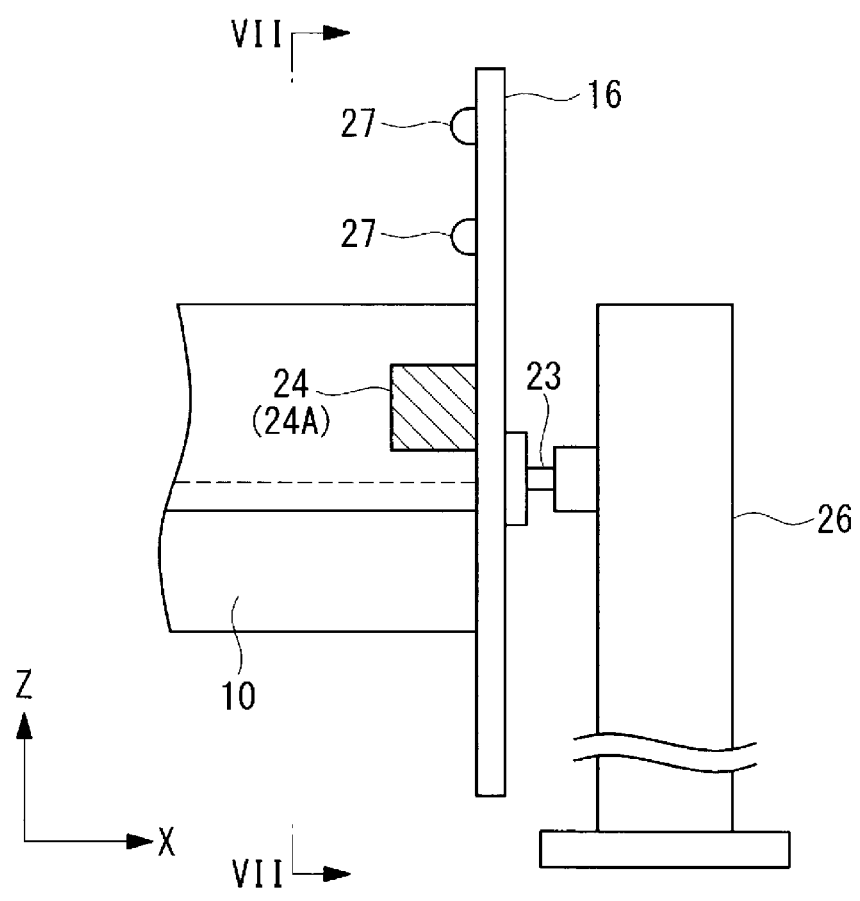
FIG. 8 is a front view illustrating a touch plate of the long member assembling device according to the embodiment of the present invention.

A configuration of the touch plate 5 will now be described with reference to FIGS. 7 and 8.

When the end surface (YZ surface) of the first end portion of the long member 10 completely comes into surface contact with a flat surface (YZ surface) of the flat plate part 16 of the touch plate 5 and is restrained in the Y direction and the Z direction, the position of the first end portion of the long member 10 coming into contact with the touch plate 5 and the extending direction of the long member 10 can be identified.

The touch plate 5 is provided with the flat plate part 16, an A reference plane jig 24 and a B reference plane jig 25 disposed on the flat plate part 16, a floating unit 23, and the reflectors 27. Note that FIGS. 7 and 8 illustrate a case in which the horizontal cross section of the long member 10 has a so-called Z shape; however, the present invention can also be applied to a long member 10 having a different cross-sectional shape by changing the arrangement position of the A reference plane jig 24 and the B reference plane jig 25. FIG. 8 illustrates a state in which the long member 10 comes into contact with the touch plate 5 disposed on a side different from that in FIG. 1.

The A reference plane jig 24 restrains the long member 10 such that the A reference plane on the long member 10 is in a reference position. The A reference plane jig 24 restrains movement of the long member 10 in the Y direction.

The A reference plane jig 24 is composed of, for example, a fixed component 24A and a movable component 24B. The fixed component 24A is installed protruding on one surface side of the flat plate part 16. The movable component 24B moves closer to and away from the fixed component 24A by an actuator (not illustrated). When the movable component 24B moves closer to the fixed component 24A, the flat plate portion of the long member 10 is sandwiched. By contrast, when the movable component 24B moves away from the fixed component 24A, sandwiching is released.

The surface of the fixed component 24A that comes into contact with the long member 10 is perpendicular to the flat surface of the flat plate part 16. This configuration ensures that the end surface of the long member 10 is pressed against the touch plate 5 and enables correct setting of the extending direction of the long member 10 when the A reference plane jig 24 restrains movement of the long member 10 in the Y direction.

The flat plate surface of the long member 10 that comes into contact with the fixed component 24A when the fixed component 24A and the movable component 24B sandwich the long member 10 is the A reference plane.

The B reference plane jig 25 restrains the long member 10 such that the B reference plane on the long member 10 is in a reference position. The B reference plane jig 25 restrains movement of the long member 10 in the Z direction.

The B reference plane jig 25 is composed of, for example, a fixed component 25A and a movable component 25B. The surface of the fixed component 25A that comes into contact with the long member 10 is perpendicular to the flat surface of the flat plate part 16. This configuration ensures that the end surface of the long member 10 is pressed against the touch plate 5 and enables correct setting of the extending direction of the long member 10 when the B reference plane jig 25 restrains movement of the long member 10 in the Z direction.

The flat plate surface of the long member 10 that comes into contact with the fixed component 25A when the fixed component 25A and the movable component 25B sandwich the long member 10 is the B reference plane.

The floating unit 23 is installed between a support 26 and the flat plate part 16. The floating unit 23 allows the flat plate part 16 to move in the X direction and incline with respect to the X direction. This configuration enables the end surface of the long member 10 to appropriately come into surface contact with the surface of the flat plate part 16 of the touch plate 5.

The support 26 is retained and installed on the table 3.

At least three reflectors 27 are installed on the flat plate part 16, and the position of each of the reflectors 27 is detected by the laser tracker 7. This configuration enables correct calculation of the position and inclination of the flat plate part 16.

Figure 9:
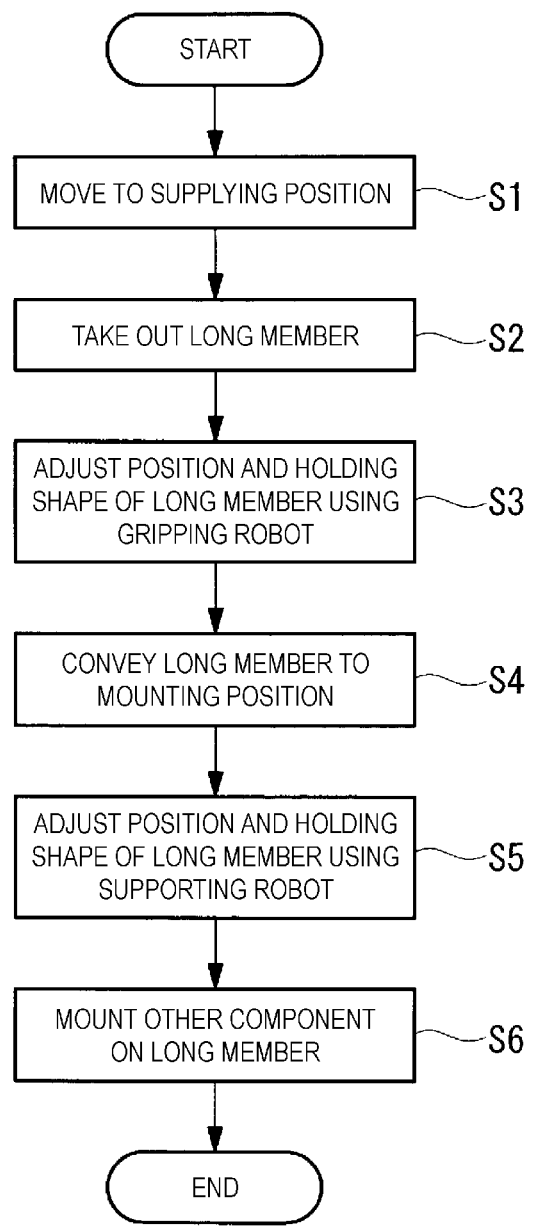
FIG. 9 is a flowchart illustrating operations of the long member assembling device according to the embodiment of the present invention.
Figure 10:
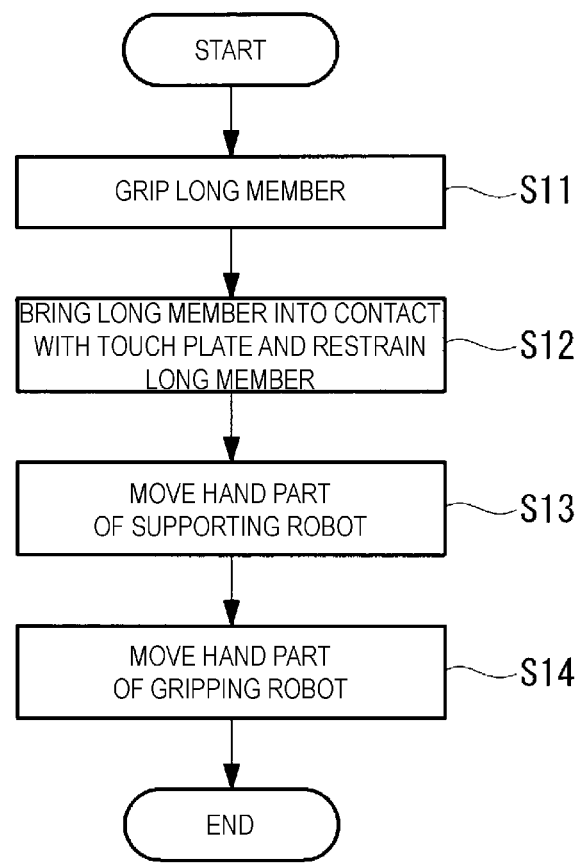
FIG. 10 is a flowchart illustrating operations of the gripping robot of the long member assembling device according to the embodiment of the present invention.

Operation of the long member assembling device according to the present embodiment is described below using FIG. 9 and FIG. 10.

Before the other components 22 are mounted on the long member 10, the long member 10 that is subject to assembly is temporarily placed on a rack or the like at the supplying position 20. The table 3 on which the supporting robots 4 are placed moves on the conveyor 2 so that the supporting robots 4 approach the long member 10 temporarily placed in the supplying position 20 (step S1). At this time, the number of the supporting robots 4 for gripping the long member 10, and the touch plate 5 to which the long member 10 comes into contact are determined. Note that the positions of the supporting robots 4 on the table 3 have been already adjusted.

Next, the hand parts 8 of the supporting robots 4 grip the long member 10 and move the long member 10 from the supplying position 20 to the conveyor 2 to take out the long member 10 from the supplying position 20 (step S2). At this time, the hand parts 8 of the supporting robots 4 preferably grip the long member 10 in such positions that the long member 10 does not bend, that is, in such positions that tensile force or compressive force is not applied to the long member 10.

Furthermore, the hand part 8 of the plurality of supporting robots 4 is moved based on the original shape of the long member 10 stored in the memory 35, and the position and holding shape of the long member 10 are adjusted by the supporting robots 4 (step S3). At this time, the first end portion of the long member 10 is restrained by the touch plate 5. This operation enables correct adjustment of the position and holding shape of the long member 10 with reference to the first end portion of the long member 10.

After the position and the like of the long member 10 are adjusted, the conveyor 2 conveys the table 3 while the plurality of supporting robots 4 continue to grip the long member 10. This operation allows the supporting robots 4 on the table 3 placed on the conveyor 2 to be conveyed and the long member 10 to be moved to the mounting position 21 where the mounting robots 6 can mount the other component 22 on the long member 10 (step S4).

Furthermore, prior to mounting the other components 22, the hand part 37 of the gripping robot 11 is moved based on the original shape of the long member 10 stored in the memory 35, and the position and holding shape of the long member 10 are adjusted by the gripping robot 11 (step S5). Furthermore, during major operations of the gripping robot 11, positional control is performed based on the reference position of the gripping robot 11 itself rather than the positional control by the laser tracker 7, and positional control is performed using the laser tracker 7 during the final fine control. The positional precision of the mounting position 21 where the other components 22 are mounted is enhanced by performing adjustments using a gripping robot 11 with higher positional precision than the plurality of supporting robots 4, without performing adjustment using the plurality of supporting robots 4.

Furthermore, the mounting robot 6 and the gripping robot 11 mount the other components 22 on the long member 10 (step S6). Furthermore, during major operations of the mounting robot 6, positional control is performed based on the reference position of the mounting robot 6 rather than the positional control by the laser tracker 7, and positional control is performed using the laser tracker 7 during the final fine control. As described above, the supporting robots 4 and the gripping robot 11 correctly adjust the position and holding shape of the long member 10, and therefore the mounting robot 6 can mount the other components 22 in a desired precise position. The supporting robots 4 may adjust the position and holding shape of the long member 10 again before the mounting robots 6 mount the other component 22 on the long member 10.

After the supporting robots 4 adjust the position and the like of the long member 10 and the long member 10 is conveyed and before the mounting robots 6 mount the other component 22, it may be checked whether the long member 10 is held in the original shape or a precise position. For example, whether or not the long member 10 is held in the original shape is determined by measuring the mounting position 21 of the other components 22 on the long member 10 and measuring the total length of the long member 10.

A method of gripping the long member 10 by the supporting robots 4 and the gripping robot 11 according to the present embodiment is described below.

The supporting robots 4 grip the long member 10 in such positions that the amount of deformation (the amount of bend) of the long member 10 is minimized (step S11). The number of the supporting robots 4 for gripping the long member 10 is determined based on the total length and shape of the long member 10, the operating range of the supporting robots 4, and the like. The gripping positions that minimize the amount of deformation of the long member 10 are determined through preliminary analysis, for example, based on the original shape of the long member 10 and the amount of deformation of the long member 10. If the touch plate 5 is used to restrain an end portion of the long member 10, the restraint imposed by the touch plate 5 is also considered as an analysis condition.

Concerning the gripping positions of the supporting robots 4, it is estimated that, for example, one of the plurality of supporting robots 4 grips an end portion of the long member 10, and the plurality of supporting robots 4 grip the long member 10 at equal intervals. On the other hand, precise gripping positions are calculated through analysis and adjusted minutely. Note that the mounting position 21 of the other component 22 mounted on the long member 10 is also considered in the analysis, and thus the gripping positions do not always minimize the amount of deformation of the long member 10.

After the long member 10 is taken out from the supplying position 20 to the conveyor 2, the supporting robots 4 bring the end portion of the long member 10 into contact with the touch plate 5. Then, the touch plate 5 restrains the end portion of the long member 10 by a method described later (step S12). This operation restrains the end portion of the long member 10 from moving in all of the X direction, Y direction, and Z direction.

If the touch plate 5 is not used, the hand parts 8 of the supporting robots 4 produce errors, and it is difficult to completely prevent movement of the long member 10. Thus, it is difficult to completely restrain movement in all of the X, Y, and Z directions. On the other hand, using the touch plate 5 can reduce errors and determine the reference position.

After the touch plate 5 restrains the end portion of the long member 10, the plurality of supporting robots 4 and the gripping robot 11 readjust the gripping position.

The hand parts 8 of the supporting robots 4 move to positions where the shape of the long member 10 gripped by the supporting robots 4 matches the original shape, based on the original shape of the long member 10 (step S13). The hand part 37 of the gripping robot 11 also moves to a position where the shape of the long member 10 supported by the gripping robot 11 matches the original shape, based on the original shape of the long member 10 (step S14).

The original shape is a shape of the long member 10 stored in the memory 35. The memory 35 stores, for example, design dimensions of the long member 10 as the original shape. The destination positions of the hand parts 8, 37 are reference positions, or in other words, the retained position of the long member 10 on the touch plate 5 is a position with the reference coordinates (0 point). The coordinates of the destination positions of the hand parts 8, 37 are calculated based on the original shape stored in the memory 35. When the hand parts 8, 37 move based on the X, Y, Z coordinates calculated as the destination positions, the long member 10 is held in a position where the shape matches the original shape.

Note that even if error occurs at the position where the hand parts 8 of the supporting robots 4 and the hand part 37 of the gripping robot 11 stop movement, the hand parts 8, 37 have a configuration that does not restrain the long member 10 in the X direction, or in other words, in the longitudinal direction of the long member 10, as described above. Thus, tensile force or compressive force is not applied to the long member 10 in the longitudinal direction. Accordingly, the long member 10 is not likely to deform.

As described above, with the present embodiment, the gripping robot 11 has less positional error when determining position as compared to the supporting robots 4. Furthermore, when adjusting the position and holding shape of the long member 10, the positional precision of the mounting position 21 where the other components 22 are mounted is enhanced by performing adjustments using a gripping robot 11 with higher positional precision than the plurality of supporting robots 4, rather than adjusting using only the supporting robots 4.

Figure 11:
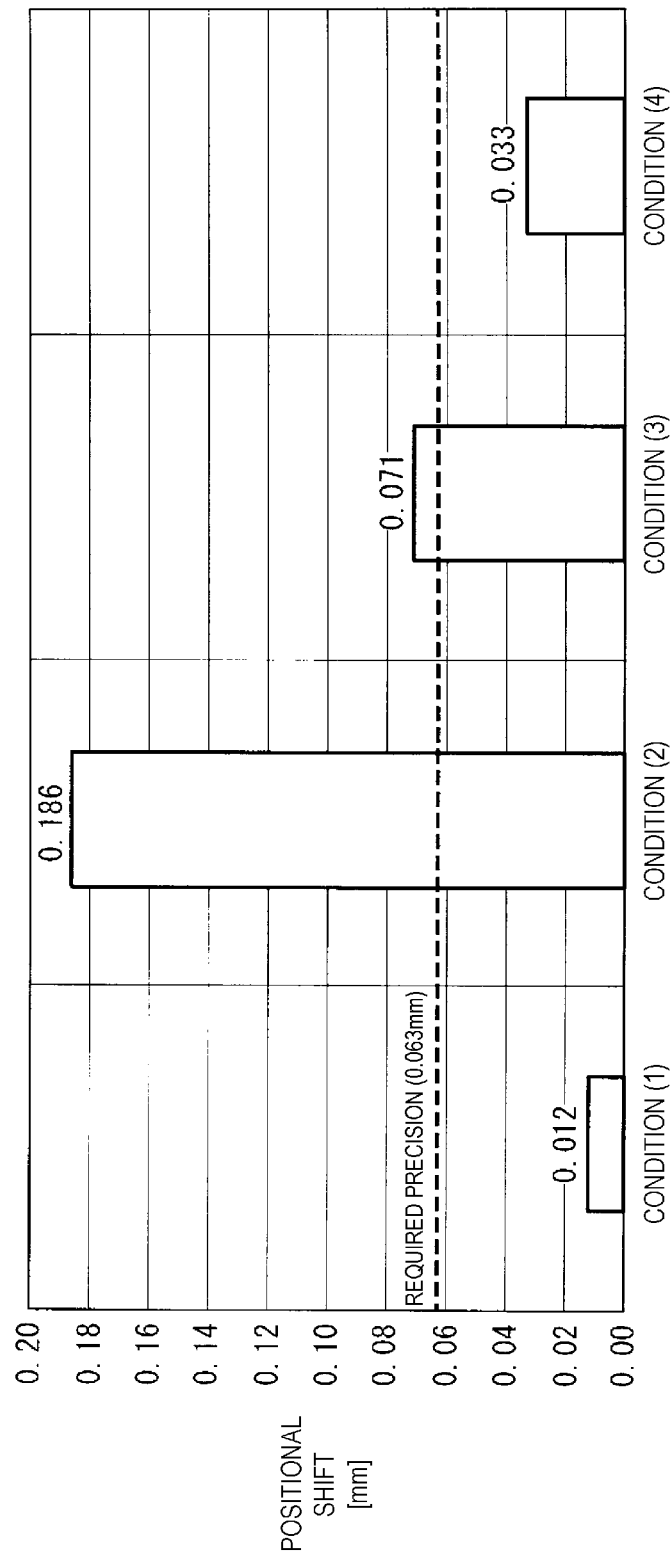
FIG. 11 is a graph showing the positional shift of the mounting position in the longitudinal direction of the stringers under each condition.

Concerning this point, if the long member 10 is a stringer with a length of 7.9 m, when the supporting robots 4 and the gripping robot 11 hold the stringer, the positional shift of the mounting position 21 that occurs in the longitudinal direction of the stringer is calculated by analysis, and it was confirmed that the positional precision was enhanced by the present embodiment. The analysis results are presented in FIG. 11. The results of FIG. 11 show the value for the positional shift of the mounting position 21 that has the largest positional shift of the 15 mounting positions 21 on the stringer under each condition.

Condition (1)

(1) shows the results when the positional precision of the hand part 8 of the supporting robots 4 was set to 0.0 mm for the case where a gripping robot 11 was not used and the stringer was supported by five supporting robots 4. In this case, the positional shift of the mounting position 21 that occurs in the longitudinal direction of the stringer was 0.012 mm. The reason that the positional shift of the mounting position 21 was not 0.0 mm is because there is slight warping of the stringer between supporting robots 4. Furthermore, this warp is expressed as the positional shift in the longitudinal direction.

Condition (2)

(2) shows the results when the positional precision of the hand part 8 of the supporting robots 4 was set to 0.5 mm for the case where a gripping robot 11 was not used and the stringer was supported by five supporting robots 4. In this case, the positional shift of the mounting position 21 that occurs in the longitudinal direction of the stringer was 0.186 mm.

Condition (3)

(3) shows the results when the positional precision of the hand part 8 of the supporting robots 4 was set to 0.5 mm and the positional precision of the hand part 37 of the gripping robot 11 was set to 0.0 mm, for the case where a stringer was supported by five supporting robots 4 and a gripping robot 11. In this case, the positional shift of the mounting position 21 that occurs in the longitudinal direction of the stringer was 0.071 mm.

Condition (4)

(4) shows the results when the positional precision of the hand part 8 of the supporting robots 4 was set to 0.2 mm and the positional precision of the hand part 37 of the gripping robot 11 was set to 0.0 mm, for the case where a stringer was supported by five supporting robots 4 and a gripping robot 11. In this case, the positional shift of the mounting position 21 that occurs in the longitudinal direction of the stringer was 0.033 mm.

For the case where a clip, which is another component 22, is provided on the stringer of the long member 10, which is the analysis subject, if the required precision for the positional shift of the mounting position 21 is 0.063 mm, it can be seen that the required precision can be satisfied if the positional precision of the hand part 8 of the supporting robots 4 is 0.2 mm, and the positional precision of the hand part 37 of the gripping robot 11 is set to 0.0 mm, in accordance with condition (4).

Furthermore, condition (4) has enhanced positional precision and satisfies the required precision, as compared to condition (2), and thus a finding was obtained that even if the positional precision of all of the plurality of supporting robots 4 is not enhanced, as with condition (1), the positional precision of the other plurality of supporting robots 4 may be low so long as the long member 10 is also supported by one gripping robot 11 with high positional precision.

In other words, with the present embodiment, the positional precision of the mounting position 21 can be enhanced by using one gripping robot 11 with high positional precision and a plurality of supporting robots 4 with lower positional precision than the gripping robot 11, as compared to the case where the long member 10 is supported only by a plurality of supporting robots 4 with low positional precision.

Furthermore, the number of robots with a reflector on the hand part of the robot can be reduced, complexity of the calculation during positional control and the difficulty of maintaining the robot main unit can be reduced. Furthermore, the cost of the entire long member assembling device 1 can also be reduced.

A method of bringing the long member 10 into contact with the touch plate 5 by the hand parts 8 of the supporting robots 4 and restraining the end portion of the long member 10 will now be described.

The supporting robots 4 use the hand parts 8 to grip predetermined positions of the long member 10 located in the supplying position 20. The gripping positions may not be as precise as those when the other components 22 are mounted, and are based on positions detected by the position detecting parts of the supporting robots 4 and the conveyor 2.

With the stoppers 13 gripping the long member 10, the supporting robots 4 bring the long member 10 into contact with the touch plate 5. At this time, the floating unit 23 completely brings the end surface (YZ surface) of the first end portion of the long member 10 into surface contact with the flat surface (YZ surface) of the touch plate 5.

Then, the A reference plane jig 24 and the B reference plane jig 25 of the touch plate 5 sandwich the long member 10 in the order of the A reference plane jig 24 and the B reference plane jig 25. This operation imposes such restraint that the A reference plane and the B reference plane on the long member 10 are in the reference positions. Then, the stoppers 13 of the supporting robots 4 release gripping of the long member 10. The long member 10 may be sandwiched in the order of the B reference plane jig 25 and the A reference plane jig 24, which is the inverse order of the above-described example.

A method of determining the reference coordinates of the long member assembling device according to the present embodiment is described below.

The reference point is set to the position of a first end portion of the long member 10 that contacts the touch plate 5. The reference point is calculated based on the position of the three reflectors provided on the touch plate 5 that touches the long member 10, for example. In other words, first, the laser tracker 7 receives the laser light reflected from the reflectors 27, and detects the positional information of the three reflectors 27. Furthermore, the reference point is calculated based on the positional information of the reflectors 27.

Specifically, the positional relationship between the position of the reflectors 27 and the position of the first end portion (reference point) of the long member 10 that is contacting the touch plate 5 is acquired beforehand, and the position of the first end portion (reference point) of the long member 10 that is contacting the touch plate 5 is calculated from the positional information of the detected reflectors 27. Even if the reflectors 27 cannot be installed at the reference point, the positional relationship between the position of the reflectors 27 and the position of the reference point is acquired beforehand, and the position of the reference point can be calculated by detecting the positional information of the reflectors 27.

With this configuration, the first end of the long member 10 is restrained and movement in the longitudinal direction of the long member 10 is constricted by the touch plate 5, and therefore the first end of the long member 10 can be used as a reference position for positioning. Furthermore, the reference coordinates or reference point used for positioning the long member 10 and adjusting the position of the hand parts 8 of the supporting robots 4 are determined from the position of the reflector 27 installed on the touch plate 5 where the first end of the long member 10 is retained, and therefore the positional adjustment of the long member 10 can be performed with precision.

Incidentally, one reflector 27 of the three reflectors 27 is preferably installed at a position as close to the reference point as possible, and the remaining two reflectors 27 are preferably installed at a position as far as possible from the reference point.

Figure 12:
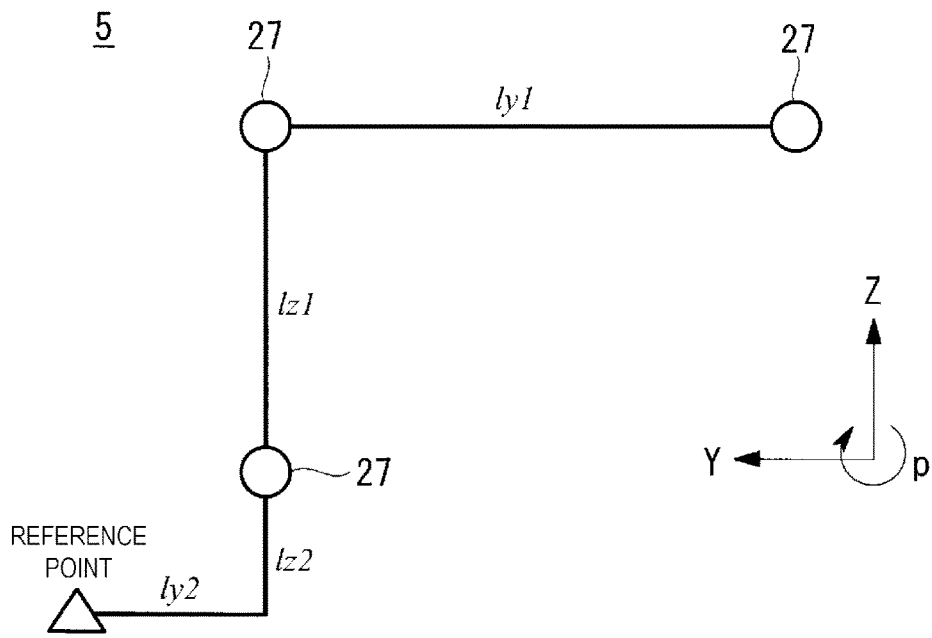
FIG. 12 is a front view illustrating the position of a reflector provided on a touch plate.

In other words, the error ($\Delta x$, $\Delta y$, $\Delta z$) that occurs when calculating the reference point is expressed by the following Equation (3), Equation (6), Equation (9), and Equation (12). The following description is made while referring to FIG. 12. FIG. 12 shows the relationship of the reference point and the reflector 27 installed on the touch plate 5. Incidentally, in the following, $\Delta x$, $\Delta y$, and $\Delta z$ represent the error in the directions x, y, and z that occur when calculating the reference point, ly1 and lz1 represent the distance between the reflectors 27, and ly2 and lz2 represent the distance between the reflector 27 and the reference point. Furthermore, $\Delta Rx$, $\Delta Ry$, and $\Delta Rz$ represent the detection error in the x, y, and z directions of the reflectors 27 determined by the performance of the laser tracker 7, and $\Delta p$, $\Delta q$, and $\Delta r$ represent the rotational error around the x-, y-, and z-axis.

When the error $\Delta x$ in the x direction that occurs when calculating the reference point is expressed by the detection error $\Delta Rx$ in the x direction of the reflectors 27 determined by the performance of the laser tracker 7 and the rotational error $\Delta r$ around the z-axis, the result is:

[Equation 1]

$$\Delta x = \sqrt{\Delta Rx^2 + (\Delta r * ly2)^2} \qquad \text{Equation (1)}.$$

The rotational error $\Delta r$ around the z-axis is

[Equation 2]

$$\Delta r = \sqrt{2} \Delta Rx / ly1 \qquad \text{Equation (2)}.$$

Therefore, based on Equation (1) and Equation (2), the error $\Delta x$ in the x direction that occurs when calculating the reference point is expressed as:

[Equation 3]

$$\Delta x = \Delta Rx \sqrt{1 + 2(ly2/ly1)^2} \qquad \text{Equation (3)}.$$

Furthermore, when the error $\Delta x$ in the x direction that occurs when calculating the reference point is expressed by the detection error $\Delta Rx$ in the x direction of the reflectors 27 determined by the performance of the laser tracker 7 and the rotational error $\Delta q$ around the y-axis, the result is:

[Equation 4]

$$\Delta x = \sqrt{\Delta Rx^2 + (\Delta q * lz2)^2} \qquad \text{Equation (4)}.$$

The rotational error $\Delta q$ around the y-axis is:

[Equation 5]

$$\Delta q = \sqrt{2} \Delta Rx / lz1 \qquad \text{Equation (5)}.$$

Therefore, based on formula Equation (4) and Equation (5), the error $\Delta x$ in the x direction that occurs when calculating the reference point is expressed as:

[Equation 6]

$$\Delta x = \Delta Rx \sqrt{1 + 2(lz2/lz1)^2} \qquad \text{Equation (6)}.$$

Therefore, the error $\Delta x$ in the x direction that occurs when calculating the reference point can be expressed by either Equation (3) or Equation (6). In order to minimize the error $\Delta x$, lz1 and lz2 can be set using Equation (3), and ly1 and ly2 can be set using Equation (6).

Similarly, when the error $\Delta y$ in the y direction that occurs when calculating the reference point is expressed by the detection error $\Delta Ry$ in the y direction of the reflectors 27 determined by the performance of the laser tracker 7 and the rotational error $\Delta p$ around the x-axis, the result is:

[Equation 7]

$$\Delta y = \sqrt{Ry^2 + (\Delta p * lz2)^2} \qquad \text{Equation (7)}.$$

The rotational error $\Delta p$ around the x-axis is expressed by:

[Equation 8]

$$\Delta p = \sqrt{2} \Delta Ry / lz1 \qquad \text{Equation (8)}.$$

Therefore, based on Equation (7) and Equation (8), the error $\Delta y$ in the y direction that occurs when calculating the reference point is expressed as:

[Equation 9]

$$\Delta y = \Delta Ry \sqrt{1 + 2(lz2/lz1)^2} \quad \text{Equation (9).}$$

Furthermore, when the error $\Delta z$ in the z direction that occurs when calculating the reference point is expressed by the detection error $\Delta Rz$ in the z direction of the reflectors 27 determined by the performance of the laser tracker 7 and the rotational error $\Delta p$ around the x-axis, the result is:

[Equation 10]

$$\Delta z = \sqrt{\Delta Rz^2 (\Delta p * ly2)^2} \quad \text{Equation (10).}$$

The rotational error $\Delta p$ around the x-axis is expressed by:

[Equation 11]

$$\Delta p = \sqrt{2} \Delta Rz / ly1 \quad \text{Equation (11).}$$

Therefore, based on Equation (10) and Equation (11), the error $\Delta z$ in the z direction that occurs when calculating the reference point is expressed as:

[Equation 12]

$$\Delta z = \Delta Rz \sqrt{+2ly2/ly1)^2} \quad \text{Equation (12).}$$

Therefore, according to Equation (3), Equation (6), Equation (9), and Equation (12), as ly2 and lz2 become larger, the error ($\Delta x$, $\Delta y$, $\Delta z$) that occurs when calculating the reference point becomes larger, but as ly2 and lz2 become smaller, the error ($\Delta x$, $\Delta y$, $\Delta z$) becomes smaller, and the precision is enhanced. Furthermore, as ly1 and lz1 become smaller, the error ($\Delta x$, $\Delta y$, $\Delta z$) becomes larger, but as ly1 and lz1 become larger, the error ($\Delta x$, $\Delta y$, $\Delta z$) becomes smaller, and the precision is enhanced.

Figure 13:
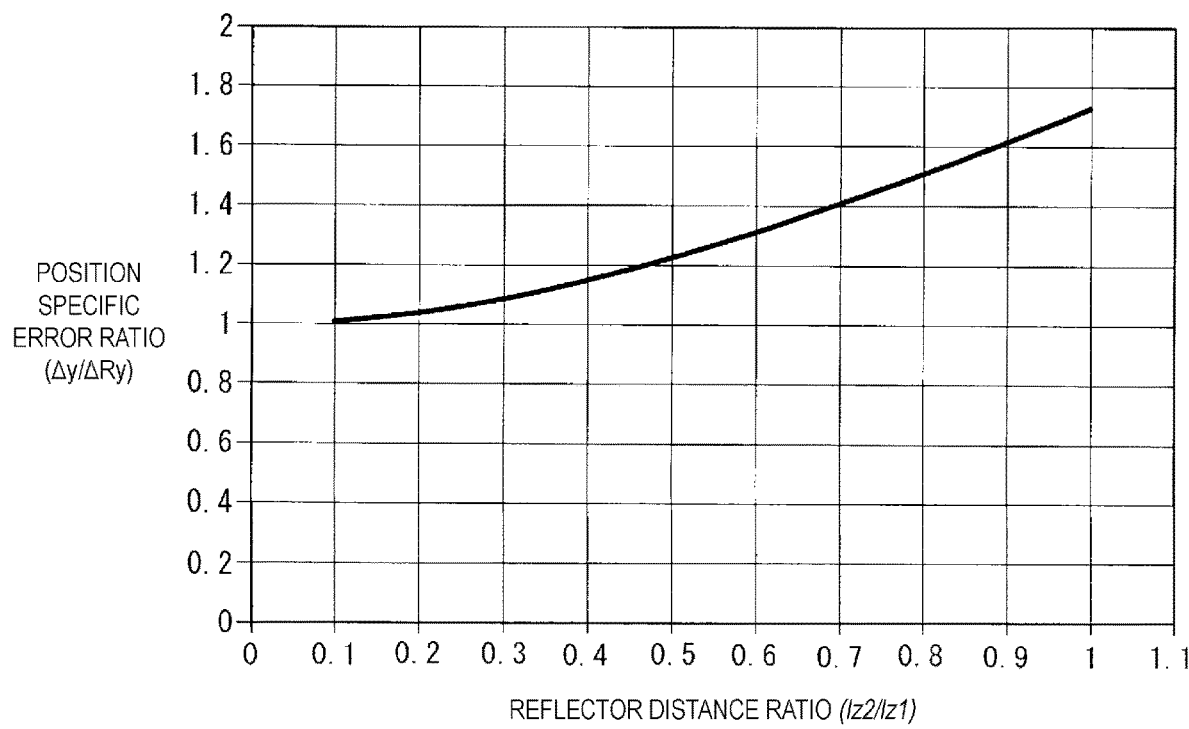
FIG. 13 is a graph showing the relationship between the reflector distance ratio and the error ratio that occurs when calculating the reference position.

Incidentally, regard to the error in the y direction that occurs when calculating the reference point, the relationship between the position of the reflectors 27 and the position of the reference point is shown in FIG. 13. FIG. 13 shows the ratio ($\Delta y / \Delta Ry$) between the error determined by the laser tracker 7 and the error caused when calculating the reference point.

According to FIG. 13, if the reflector distance ratio (lz2/lz1) is approximately 0.1, the error ratio ($\Delta y / \Delta Ry$) will be 1, and the error that occurs when calculating the reference point will be the error determined by the laser tracker 7. On the other hand, if the reflector ratio (lz2/lz1) is larger, the error ratio ($\Delta y / \Delta Ry$) will be larger, and the error that occurs when calculating the reference point will deteriorate with regard to the error determined by the laser tracker 7. If the reflector ratio (lz2/lz1) is 0.9, the error that occurs when calculating the reference point will the approximately 1.6 times the error determined by the laser tracker 7.

In the aforementioned description, the reference point set at the position of the first end portion of the long member 10 that is in contact with the touch plate 5 was described, but an action point used in positional control of the hand part 37 of the gripping robot 11 and positional control of the hand part 17 of the mounting robot 6 is similarly calculated.

The action point used in the positional control of the hand part 17 of the mounting robot 6 is the position where the mounting operation of the component 22 is performed by the hand part 17, and the action point that is used for the positional control of the hand part 37 of the gripping robot 11 is the position where the hand part 37 grips the long member 10.

The action points are calculated based on the position of the three reflectors 28 that were installed on the hand part 17, for the case of the mounting robot 6, and calculated based on the position of the three reflectors 29 that were installed on the hand part 37, for the case of the gripping robot 11. In other words, when the case of the mounting robot 6 is described, first, the laser tracker 7 receives the laser light reflected by the reflectors 28, and detects the positional information of the three reflectors 28. Furthermore, the action point is calculated based on the positional information of the reflectors 28.

Specifically, the positional relationship between the position of the reflectors 28 and the position of the action points is acquired beforehand, and the position of the action points is calculated from the positional information of the detected reflectors 28. The reflectors 28 cannot be installed at the action point, and the positional relationship between the position of the reflectors 28 and the position of the action points is acquired beforehand, and the position of the action point can be calculated by detecting the positional information of the reflectors 28. For the case of the gripping robot 11, the action points can be similarly calculated using the reflectors 29.

Incidentally, one reflector 28, 29 of the three reflectors 28, 29 is preferably installed at a position as close to the action point as possible, and the remaining two reflectors 28, 29 are preferably installed at a position as far as possible from the action point.

A method of determining the reference coordinates of the long member assembling device according to the present embodiment is described below.

The reference coordinates are set based on the one or two reflectors 27 installed on one side of the touch plate 5 and the one or two reflectors 27 installed on the other side of the touch plate. For example, one of the reflectors 27 on the touch plate 5 disposed on the first end portion side of the table 3 is detected, and two of the reflectors 27 on the touch plate 5 disposed on the second end portion side of the table 3 are detected. This operation determines the XY plane and sets the reference coordinate.

Two reflectors 27 are installed such that the long member 10 is sandwiched in the longitudinal direction, and the third reflector 27 is installed on either side in the longitudinal direction such that the short direction (direction orthogonal to the longitudinal direction) of the long member 10 is sandwiched between reflectors. Thereby, a biaxial coordinate system is set. The distance between the two reflectors 27 that are installed in the longitudinal direction of the long member 10 is longer than the length in the longitudinal direction of the long member 10, thus the inclined error in the longitudinal direction of the long member 10 can be reduced.

The distance between the two reflectors 27 that are installed in the short direction (direction orthogonal to the longitudinal direction) of the long member 10 is preferably longer than the length in the longitudinal direction of the long member 10.

On the other hand, for the case where the distance between two reflectors 27 installed in the longitudinal direction of the long member 10, or the distance between two reflectors 27 installed on the short direction of the long member 10, cannot be set longer than the length in the longitudinal direction of the long member 10 or the length in the short direction, the installation position of the reflectors 27 can be determined, while considering the error ratio determined from the reflector distance ratio (lx2/lx1 or ly2/ly1).

When setting the reference coordinate under these conditions, the error ($\Delta x$, $\Delta y$, $\Delta z$) generated when calculating the position of the end part on the opposite side on the long member 10 as the touch plate 5 is expressed by the equation below. Herein, lx1 and ly1 refer to the distance between two reflectors 27, and represent the distance for the case where two reflectors 27 cannot be installed so as to sandwich the long member 10 in the longitudinal direction or the short direction of the long member 10, as illustrated in FIG. 14.

Furthermore, the following equation assumes that the long member 10 has a shape that does not have a large curve in the z direction.

Figure 14:
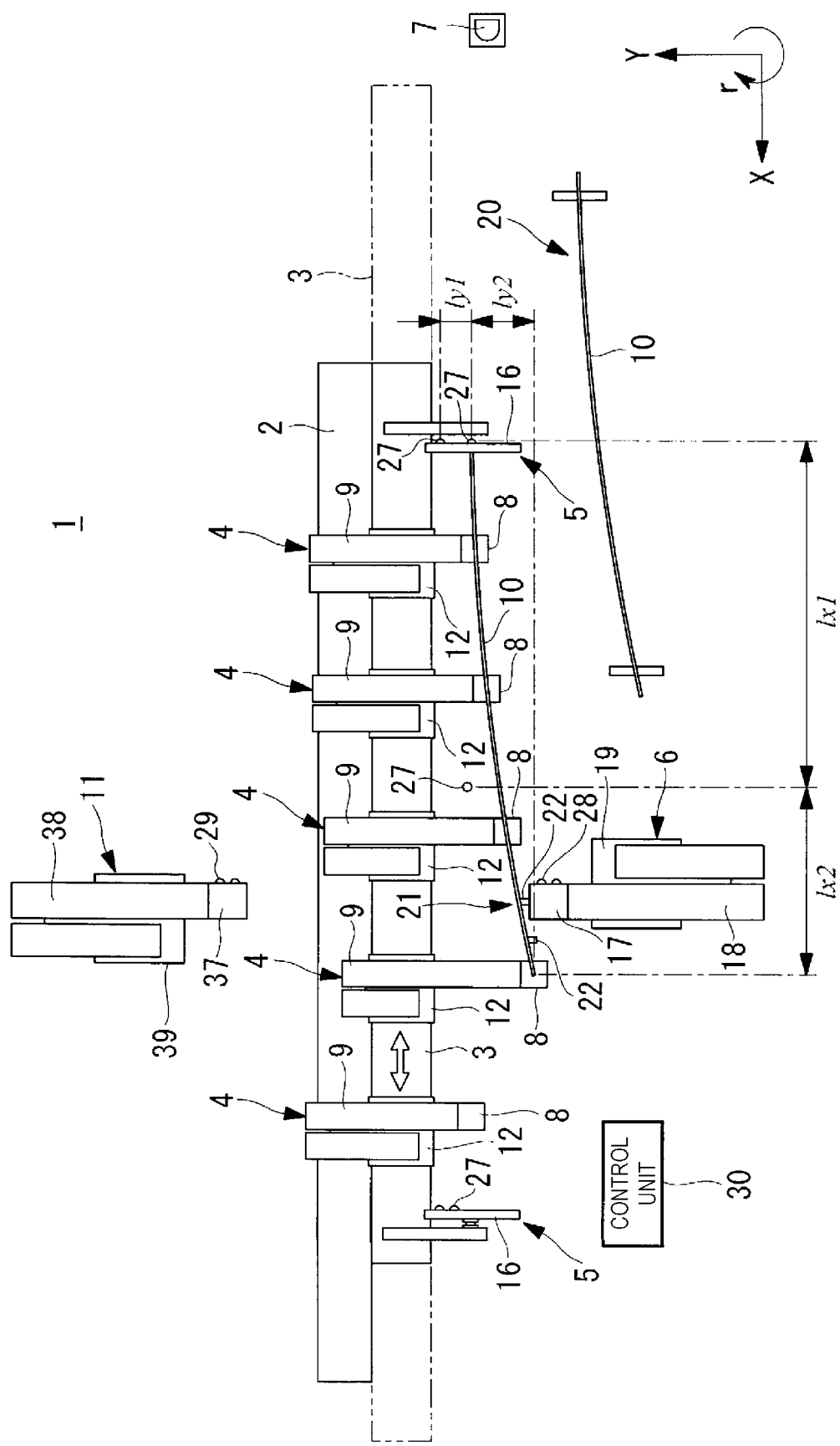
FIG. 14 is a plan view illustrating an alternate example of a long member assembling device according to an embodiment of the present invention.

The following description is made while referring to FIG. 14. In the following, $\Delta x$, $\Delta y$, and $\Delta z$ represent the error in the directions x, y, and z that occur when calculating the position of the end part of the long member 10 on the opposite side as the touch plate 5, lx1 and ly1 represent the distance between the reflectors 27, and lx2 and ly2 represent the distance between the reflector 27 and the aforementioned end part of the long member 10. Furthermore, $\Delta Rx$, $\Delta Ry$, and $\Delta Rz$ represent the detection error in the x, y, and z directions of the reflectors 27 determined by the performance of the laser tracker 7, and $\Delta p$, $\Delta q$, and $\Delta r$ present the rotational error around the x-, y-, and z-axis. However, the angle between $\Delta p$, $\Delta q$, and $\Delta r$ are miniscule, so the following approximate equation (Equation (13)) was applied.

[Equation 13]

$$\cos \Delta p = \cos \Delta q = \cos \Delta r = 1$$
$$\sin \Delta p = \Delta p, \sin \Delta q = \Delta q, \sin \Delta r = \Delta r \quad \text{Equation (13)}$$

When the error $\Delta x$ in the x direction that occurs when calculating the position of the end part of the long member 10 on the opposite side as the touch plate 5 is expressed by the detection error $\Delta Rx$ in the x direction of the reflector 27 determined by the performance of the laser tracker 7, the result is:

[Equation 14]

$$\Delta x = \Delta Rx \quad \text{Equation (14).}$$

When the error $\Delta y$ in the y direction that occurs when calculating the position of the end part of the long member 10 on the opposite side as the touch plate 5 is expressed by the detection error $\Delta Ry$ in the y direction of the reflector 27 determined by the performance of the laser tracker 7, and the rotational error $\Delta r$ around the z-axis, the result is:

[Equation 15]

$$\Delta y = \sqrt{\Delta Ry^2 + (\Delta r \ast lx2)^2} \quad \text{Equation (15).}$$

The rotational error $\Delta r$ around the z-axis is:

[Equation 16]

$$\Delta r = \sqrt{2} \Delta Ry / lx1 \quad (16).$$

Therefore, based on Equation (15) and Equation (16), the error $\Delta y$ in the y direction that occurs when calculating the position of the end part of the long number 10 is expressed as:

[Equation 17]

$$\Delta y = \Delta Ry \sqrt{1 + 2(lx2/lx1)^2} \quad \text{Equation (17).}$$

Furthermore, when the error $\Delta z$ in the z direction that occurs when calculating the position of the end part of the long member 10 on the opposite side as the touch plate 5 is expressed by the detection error $\Delta Rz$ in the z direction of the reflector 27 determined by the performance of the laser tracker 7, and the rotational error $\Delta q$ around the y-axis, the result is:

[Equation 18]

$$\Delta z = \sqrt{\Delta Rz^2 + (\Delta q \ast lx2)^2 + (\Delta p \ast ly2)^2} \quad \text{Equation (18).}$$

The rotational error $\Delta q$ around the y-axis is expressed by:

[Equation 19]

$$\Delta q = \sqrt{2} \Delta Rz / lx1 \quad \text{Equation (19).}$$

and the rotational error $\Delta p$ around the x-axis is expressed by:

[Equation 20]

$$\Delta p = \sqrt{2} \Delta Rz / ly1 \quad \text{Equation (20).}$$

Therefore, based on Equation (18), Equation (19), and Equation (20), the error $\Delta z$ in the z direction that occurs when calculating the position of the end part of the long number 10 is expressed as:

[Equation 21]

$$\Delta z = \Delta Rz \sqrt{1 + (lx2/lx1)^2 + (ly2/ly1)^2} \quad \text{Equation (21).}$$

Therefore, according to Equation (14), Equation (17), and Equation (21), as lx2 and ly2 become larger, the error ($\Delta x$, $\Delta y$, $\Delta z$) that occurs when calculating the end part of the long member 10 becomes larger, but as lx2 and ly2 become smaller, the error ($\Delta x$, $\Delta y$, $\Delta z$) becomes smaller, and the precision is enhanced. Furthermore, as lx1 and ly1 become smaller, the error ($\Delta x$, $\Delta y$, $\Delta z$) becomes larger, but as lx1 and ly1 become larger, the error ($\Delta x$, $\Delta y$, $\Delta z$) becomes smaller, and the precision is enhanced.

As described above, in the present embodiment, the position of the reference point can be precisely set by providing the reflector 27 such that the positional error of the reference point determined by the reference determining part 50 is smaller than the detection error of the laser tracker 7, for example. Conversely, if the positional error of the reference point calculated by the position calculating part is larger than the detection error of the laser tracker 7, the degrees of freedom of the installation position of the reflector 27 can be increased, but the positional precision of the reference point will be inferior.

In the foregoing description, the reflectors were always provided on the hand part 17, 37, but the present invention is not restricted to this example. For example, detection is not necessarily performed by the laser tracker 7 at all times, and error inherent to the mounting robot 6 or the gripping robot 11 may be detected beforehand using the laser tracker 7, and the error stored. The reflectors are detached during mounting, and the mounting robot 6 or the gripping robot 11 are mounted and operated in consideration of the stored error, and thus the precision for mounting the component 22 can be enhanced.

Furthermore, the case where the supporting robots 4 and the touch plate 5 are placed on the conveyor 2 was described above, but the present invention is not limited to this example, and a configuration is possible where the mounting robot 6 and the gripping robot 11 may be placed on the conveyor in a movable manner relative to the supporting robots 4 and the touch plate 5.

The supporting robots 4 are arranged at predetermined intervals on the table 3 and integrated with the table 3 in the above-described embodiment; however, the present invention is not limited to this example. For example, the supporting robots 4 may be installed in a self-propelled manner on the table 3 based on the length and shape of the long member 10 to be gripped. In this case, positional information of the supporting robots 4 with respect to a reference position on the table 3 is also used to position the hand parts 8 of the supporting robots 4.

REFERENCE SIGNS LIST

1 Long member assembling device
2 Conveyor
3 Table
4 Supporting robot
5 Touch plate
6 Mounting robot
7 Laser tracker
8, 17, 37 Hand part
9, 18, 38 Arm part
10 Long member
11 Supporting robot
12, 19, 39 Trunk part
13 Stopper
13A Stationary component
13B Movable component
14 A reference plane roller part
14A Stationary roller
14B Movable roller
15 B reference plane roller part
15A Stationary roller
15B Movable roller
16 Flat plate part
20 Supplying position
21 Mounting position
22 Component
23 Floating unit
24 A reference plane jig
25 B reference plane jig
26 Support
27 Reflector
30 Control unit
31 Conveyor control unit
32 Supporting robot control unit
33 Mounting robot control unit
34 Gripping robot control unit
35 Memory

The invention claimed is:

1. An assembly manufacturing device, comprising:
a plurality of first gripping parts that grips a first member having a long shape;
a retaining part that retains a first end of the first member and restricts movement of the first member in a longitudinal direction;
a first driving part that moves the first gripping parts and adjusts positions of the first gripping parts that grip the first member;
a detecting part that detects an installation position of the retaining part;
a reference determining part for determining a reference point or reference coordinates used for adjusting the positions of the first gripping parts, based on the installation position of the retaining part detected by the detecting part;
a storing part for storing an original shape of the first member;
a control unit for driving the first driving part and adjusting the positions of the plurality of first gripping parts that grips the first member, such that the shape of the first member gripped by the first gripping parts matches the original shape, based on the original shape stored in the storage part and the reference coordinates or reference point determined by the reference determining part; and
a first reflecting part that reflects laser light, provided on the retaining part;
wherein the detecting part comprises:
an irradiating part that irradiates laser light while scanning;
a light receiving part that receives the laser light reflected by the first reflecting part; and
a position calculating part that calculates the installation position of the retaining part on which the first reflecting part is provided, based on the laser light reflected by the first reflecting part and received by the light receiving part,
the reference determining part determines the reference coordinates or reference point based on the installation position of the retaining part calculated by the position calculating part, and
the position of the first reflecting part is set such that a positional error of the reference point determined by the reference determining part is smaller than a detection error of the detecting part, the positional error occurring when the reference point is calculated.

2. The assembly manufacturing device according to claim 1, further comprising two or one mutually separated second reflecting parts provided at a position different from the retaining part;
wherein one or two mutually separated first reflecting parts are provided on the retaining part;
the position calculating part calculates the installation position of the second reflecting part based on the laser light reflected by the second reflecting part and received by the light receiving part; and
the reference determining part determines the reference coordinates based on the installation position of the second reflecting part and the installation position of the retaining part calculated by the position calculating part.

3. The assembly manufacturing device according to claim 1,
wherein three first reflecting parts are provided, mutually separated on the retaining part;
the position calculating part calculates the installation position of the retaining part on which the first reflecting parts are provided, based on the laser light reflected by the first reflecting parts and received by the light receiving part; and
the reference determining part determines the reference point based on the installation position of the retaining part calculated by the position calculating part.

4. An assembly manufacturing device according to claim 1, further comprising:
at least one second gripping part that grips the first member in a quantity fewer than the first gripping parts;
a second driving part that moves the at least one second gripping part and adjusts a position of the at least one second gripping part that grips the first member, having higher precision than positional precision during positional adjustment of the first gripping part by the first driving part; and
a third reflecting part provided on the at least one second gripping part;

wherein the position calculating part calculates the installation position of the third reflecting part based on the laser light reflected by the third reflecting part and received by the light reflecting part;

the reference determining part determines the position that the at least one second gripping part grips the first member based on an installation position of the third reflecting part that was calculated by the position calculating part; and the control unit drives the first driving part and the second driving part, and adjusts the position of the plurality of first gripping parts and the at least one second gripping part such that the shape of the first member gripped by the first gripping parts and the at least one second gripping part matches the original shape of the first member stored in the storing part, based on the original shape of the first member stored in the storing part and the reference coordinates or reference point determined by the reference determining part.

5. The assembly manufacturing device according to claim 1, further comprising:

a mounting robot for mounting a second member to the first member; and a fourth reflecting part provided on the mounting robot;

wherein the position calculating part calculates an installation position of the fourth reflecting part, based on laser light reflected by the fourth reflecting part and received by the light receiving part, and the reference determining part determines the position where the mounting robot mounts the second member, based on the installation position of the fourth reflecting part calculated by the position calculating part.

6. The assembly manufacturing device according to claim 1, wherein the retaining part is a touch plate which is configured to retain the first end of the first member and to restrict the movement of the first member in the longitudinal direction.

7. An assembly manufacturing method, comprising:

a step where a plurality of first gripping parts grips a first member having a long shape;

a step where a retaining part retains a first end of the first member and restricts movement of the first member in a longitudinal direction;

a step where a first driving part that moves the first gripping parts and adjusts a position of the first gripping parts that grip the first member;

a step where a detecting part detects an installation position of the retaining part;

a step where a reference determining part determines a reference point or a reference coordinates that is used for adjusting the positions of the first gripping parts, based on the installation position of the retaining part detected by the detecting part, wherein a control unit drives the first driving part and adjusts the positions of the plurality of first gripping parts that grips the first member, such that the shape of the first member gripped by the first gripping parts matches an original shape, based on the original shape stored in a storing part and the reference coordinates or reference point determined by the reference determining part; and the step where the detecting part detects the installation position of the retaining part comprises:

a step where a first reflecting part reflects laser light, provided on the retaining part;

a step where an irradiating part irradiates laser light while scanning;

a step where a light receiving part receives the laser light reflected by the first reflecting part;

a step where a position calculating part calculates an installation position of the retaining part on which the first reflecting part is provided, based on the laser light reflected by the first reflecting part and received by the light receiving part; and a step where the reference determining part determines the reference coordinates or reference point based on the installation position of the retaining part calculated by the position calculating part; and further comprising a step of determining the position of the first reflecting part such that a positional error of the reference point determined by the reference determining part is smaller than a detection error of the detecting part, the positional error occurring when the reference point is calculated.

8. The assembly manufacturing method according to claim 7, wherein the retaining part is a touch plate which is configured to retain the first end of the first member and to restrict the movement of the first member in the longitudinal direction.

* * * * *